United States Patent
Pedersen et al.

(10) Patent No.: US 9,292,792 B1
(45) Date of Patent: Mar. 22, 2016

(54) CLASSIFICATION SYSTEMS AND METHODS USING CONVEX HULLS

(71) Applicant: Lockheed Martin Corporation, Bethesda, MD (US)

(72) Inventors: Richard N. Pedersen, Tom River, NJ (US); Mark A. Friesel, Ewing, NJ (US); Paul D. Mountcastle, Moorestown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 152 days.

(21) Appl. No.: 14/039,298

(22) Filed: Sep. 27, 2013

Related U.S. Application Data

(60) Provisional application No. 61/706,620, filed on Sep. 27, 2012.

(51) Int. Cl.
*G06F 17/00* (2006.01)
*G06N 5/02* (2006.01)
*G06N 99/00* (2010.01)

(52) U.S. Cl.
CPC .............. *G06N 5/02* (2013.01); *G06N 99/005* (2013.01)

(58) Field of Classification Search
USPC .......................................................... 706/46
See application file for complete search history.

(56) References Cited

U.S. PATENT DOCUMENTS

| | | | |
|---|---|---|---|
| 7,724,183 B2 | 5/2010 | Mountcastle | |
| 7,994,967 B2 | 8/2011 | Mountcastle | |
| 8,098,183 B1 | 1/2012 | Pedersen | |
| 8,134,492 B1 * | 3/2012 | Friesel | G01S 13/426 342/147 |
| 8,149,161 B1 * | 4/2012 | Friesel | G01S 13/723 342/118 |
| 8,184,041 B1 * | 5/2012 | Friesel | G01S 7/003 342/147 |
| 8,222,861 B1 * | 7/2012 | Pedersen | 320/108 |
| 8,232,911 B1 * | 7/2012 | Pedersen | 342/45 |
| 8,253,621 B1 * | 8/2012 | Friesel | G01S 7/003 342/147 |
| 8,299,956 B1 * | 10/2012 | Friesel | G05D 1/0206 342/41 |
| 8,378,880 B1 | 2/2013 | Boka et al. | |
| 8,416,122 B1 * | 4/2013 | Pedersen | 342/95 |
| 8,427,364 B1 * | 4/2013 | Friesel | G01S 7/295 342/73 |
| 8,477,061 B1 * | 7/2013 | Pedersen | 342/42 |
| 8,701,162 B1 * | 4/2014 | Pedersen | 726/4 |
| 8,912,947 B1 * | 12/2014 | Friesel | G01S 13/72 342/175 |

(Continued)

OTHER PUBLICATIONS

Consensus value of multi-agent networked systems with time-delay Fuxiao Tan; Derong Liu; Xinping Guan Service Operations, Logistics and Informatics, 2009. SOLI '09. IEEE/INFORMS International Conference on Year: 2009 pp. 179-184, DOI: 10.1109/SOLI.2009.5203926 IEEE Conference Publications.*

(Continued)

*Primary Examiner* — Michael B Holmes
(74) *Attorney, Agent, or Firm* — Howard IP Law Group

(57) ABSTRACT

A computerized classifier system that forms convex hulls containing all training experiences for each target class (e.g. threat/non-threat) is disclosed. The intersection of convex hulls for each pair of classes defines a region of ambiguity in feature space. Measurement of feature vector(s) outside an ambiguous region of feature space leads to a class decision while measurement of feature vector(s) within an ambiguous region of feature space defined by convex hulls causes a transition to a new feature space with new features. In particular embodiments, measured feature data includes estimated motion states and electrical lengths of a given object, and range, velocity and acceleration image data from second phase differences for debris mitigation.

11 Claims, 19 Drawing Sheets

(56) References Cited

U.S. PATENT DOCUMENTS

| | | | | |
|---|---|---|---|---|
| 8,912,948 B1* | 12/2014 | Friesel | ............... | G01S 7/295 342/73 |
| 8,963,765 B1* | 2/2015 | Pedersen | ............... | 342/95 |
| 9,008,362 B1* | 4/2015 | Friesel | ............... | G01S 7/003 382/100 |
| 9,081,092 B1* | 7/2015 | Friesel | ............... | G01S 13/726 1/1 |
| 9,140,784 B1* | 9/2015 | Friesel | ............... | G01S 13/581 1/1 |
| 9,165,167 B1* | 10/2015 | Friesel | ............... | G06G 7/80 1/1 |

OTHER PUBLICATIONS

Containment control with multiple stationary or dynamic leaders under a directed interaction graph Cao, Yongcan; Wei Ren Decision and Control, 2009 held jointly with the 2009 28th Chinese Control Conference. CDC/CCC 2009. Proceedings of the 48th IEEE Conference on Yr: 2009 pp. 3014-3019, DOI: 10.1109/CDC.2009.5399946 IEEE Journals & Magazine.*

The Asymptotic Consensus Problem on Convex Metric Spaces Matei, I.; Baras, J.S. Automatic Control, IEEE Transactions on Year: 2015, vol. 60, Issue: 4 pp. 907-921, DOI: 10.1109/TAC.2014.2362988 Referenced in: IEEE Journals & Magazines IEEE Journals & Magazines.*

Convexity based object partitioning for robot applications Stein, S.C.; Worgotter, F.; Schoeler, M.; Papon, J.; Kulvicius, T. Robotics and Automation (ICRA), 2014 IEEE International Conference on Year: 2014 pp. 3213-3220, DOI: 10.1109/ICRA.2014.6907321 Referenced in: IEEE Conference Publications.*

Semisupervised One-Class Support Vector Machines for Classification of Remote Sensing Data Munoz-Mari, J.; Bovolo, F.; Gomez-Chova, L.; Bruzzone, L.; Camp-Valls, G. Geoscience and Remote Sensing, IEEE Transactions on Year: 2010, Volume: 48, Issue: 8 pp. 3188-3197, DOI: 10.1109/TGRS.2010.2045764 IEEE Journals & Magazines.*

Face Recognition via Archetype Hull Ranking Yuanjun Xiong; Wei Liu; Deli Zhao; Xiaoou Tang Computer Vision (ICCV), 2013 IEEE International Conference on Year: 2013 pp. 585-592, DOI: 10.1109/ICCV.2013.78 Referenced in: IEEE Conference Publications.*

Containment control with multiple stationary or dynamic leaders under a directed interaction graph Cao, Yongcan; Wei Ren Decision and Control, 2009 held jointly with the 2009 28th Chinese Control Conference. CDC/CCC 2009. Proceedings of the 48th IEEE Conference pp. 3014-3019, DOI: 10.1109/CDC.2009.5399946 IEEE Conference Publications.*

Event-triggered based containment control of multi-agent systems with general linear dynamics Dong Wang; Zehua Wang; Wei Wang; Jie Lian Information and Automation, 2015 IEEE International Conference on Year: 2015 pp. 1064-1069, DOI: 10.1109/ICInfA.2015.7279444 Referenced in: IEEE Conference Publications.*

* cited by examiner

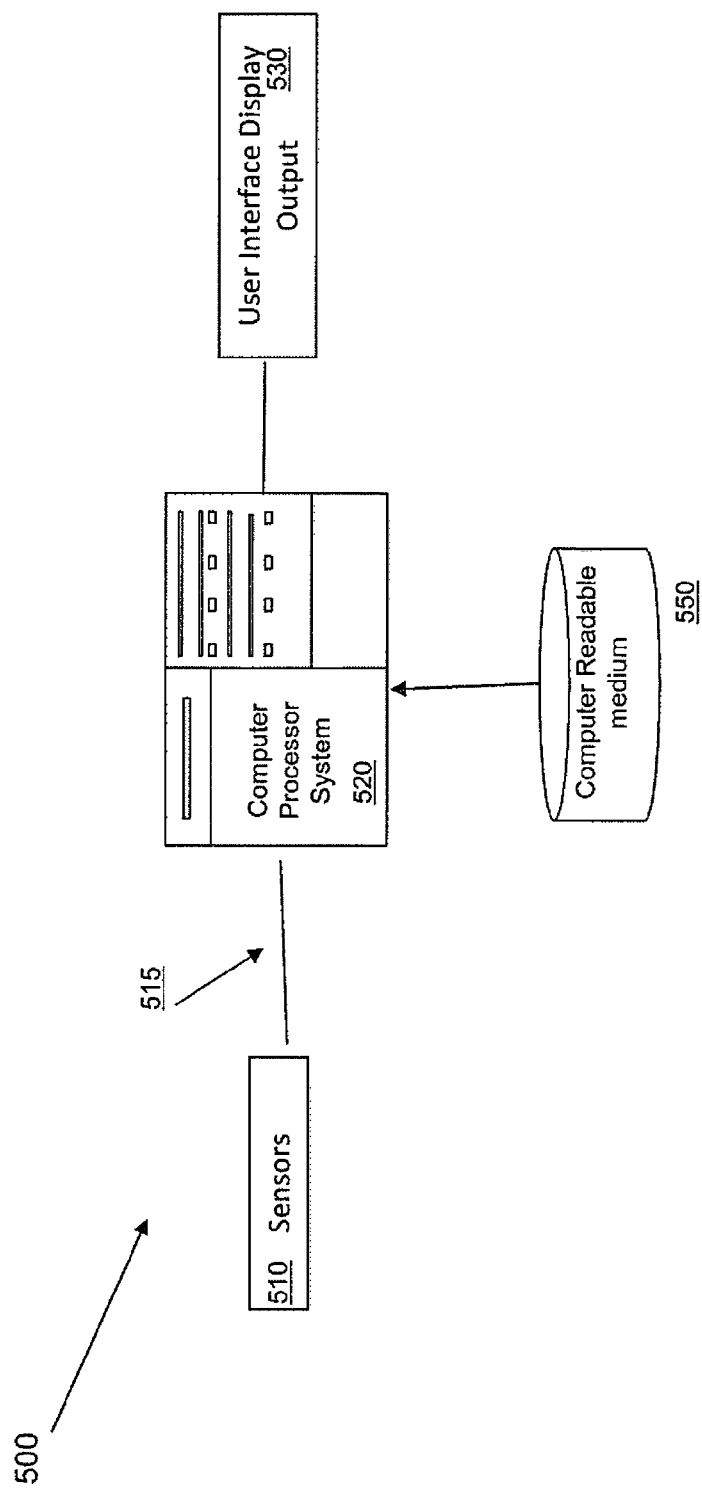

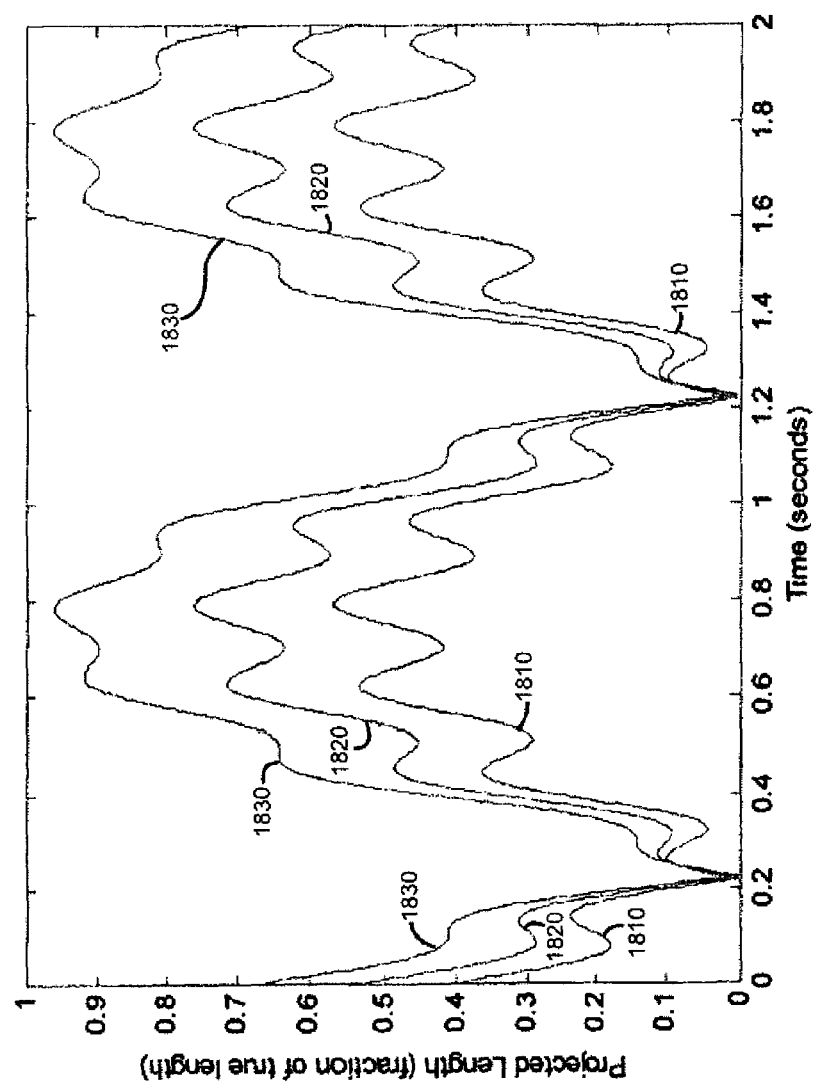
*Figure 18* (Principal Axis Tilt 5o)

CLASSIFICATION SYSTEMS AND METHODS USING CONVEX HULLS

CROSS-REFERENCE TO RELATED APPLICATIONS

This application claims the benefit of U.S. Provisional Patent Application No. 61/706,620, filed Sep. 27, 2012, the entire disclosure of which is incorporated by reference herein for all purposes.

FIELD OF THE INVENTION

This disclosure relates generally to classifier systems, and more particularly, to systems and methods for feature discrimination techniques using measured data without introduction of a parametric probabilistic model.

BACKGROUND

Classification techniques are used to allow machines (e.g. computers) to classify or identify objects. Object or target discrimination is often implemented in a resource-limited environment and requires a mechanism for choosing discrimination features and associated waveforms in real-time based on knowledge developed through a sequence of sensor measurements. By way of non-limiting example, real-time tactical ballistic missile discrimination requires real-time adaptive decision structures to conserve radar waveform and beam resources.

Improved systems and methods for performing real-time adaptive classification and discrimination are desired.

SUMMARY

The present disclosure provides a dynamic computerized classifier system and method useful in a variety of applications and technologies, including by way of non-limiting example, military and civilian radar and imaging systems, medical and diagnostic imaging and testing, security systems, including computer security, financial systems including stock price monitoring and price fluctuation analysis, and traffic monitoring systems.

The present disclosure is embodied in a computerized classifier system that forms convex hulls containing all training experiences (measurement data) for each target class (e.g. threat/non-threat). The intersection of convex hulls for each pair of classes defines a region of ambiguity in feature space. Measurement of feature vector(s) outside an ambiguous region of feature space leads to a class decision while measurement of feature vector(s) within an ambiguous region of feature space defined by convex hulls causes a transition to a new feature space with new features. The classifier structure according to the present disclosure provides for more deeply nested feature spaces having greater waveform resource requirements, and automatically load-shedding by discriminating non-threatening tracks early using reduced and/or minimal radar resources. The system thus automatically conserves radar resources for discriminating tracks requiring additional information (features).

According to an aspect of the present disclosure, there is provided a dynamic classifier configured to control resources by using only the features and processes, collectively referred to as nodes or states, that it needs to arrive at a classification of a given object with a requisite degree of confidence. The present disclosure provides a computerized method that permits a classifier to dynamically request sensor resources in an automatic way as the classification decision process unfolds in time, thereby enhancing sequencing while addressing conflicts associated with the time required to make a classification decision, the sensor resources required to make that decision, and the probability of the decision being made correctly.

The method of the present disclosure is applicable to classifying a change in the state of a target being monitored. The target is monitored by sensing or measuring one or more features of the target where the features are something whose monitored characteristics changes as the target goes from state A to sate B. This will be referred to herein as the feature data. In one preferred embodiment, the monitoring and/or classification of the target is performed by a computerized system comprising a processor in which a set of coded programming instructions are executed to perform the method of the present disclosure. The method uses one or more graphs that allows rapid classification of unclassified tracks. The graph(s) may be developed using data from multiple sensor types and may associate events from different sources (e.g. different vehicles) to develop classifications. Real-time processing may use data from multiple sensor types to allow a rapid classification.

In one embodiment, a hierarchical classifier technique comprises a pre-processing phase, where convex hulls corresponding to classes are pre-computed and then arranged into a graph data structure, and a run-time phase where the graph is traversed to identify which measurement types should be used to reduce the ambiguity or uncertainty (i.e. disambiguate) associated with a discrimination candidate. Advantageously, the disclosed convex hull-based classifier structure is not essentially probabilistic or Bayesian, and the disclosed classification system bypasses the step of modeling class-conditional probability densities and proceeds straight to definition of decision surfaces via non-parametric analysis of training data. Moreover, the non-parametric hull technique of the present disclosure is well suited for use with Monte-Carlo training data sets while providing simple convex hull computations with classification scheme scales extendible to feature space of any dimension. The system further provides for simple incorporation of new data by adding additional points to the convex hull. Determination of a well-defined ambiguity volume and use of non-parametric ambiguity volume as a trigger to transition to a new classifier and to drive radar resource utilization improves overall system response time and performance.

A state-based classifier according to an aspect of the disclosure automatically defines volumes of ambiguity in a multidimensional feature space. These ambiguity volumes are based directly on training experience by means of convex hulls that surround training state vectors of each class, without the introduction of a parametric model of class conditional probability. Measurement of a feature vector within a volume of ambiguity causes a state change to another classifier employing different features with new waveform requirements. Resources are conserved by retiring nonthreatening tracks using simple features and reserving high resource waveforms for situations where the class decision remains ambiguous.

In an exemplary embodiment, a classifier system operates by determining and selecting a first measurement sensor for sensing one or more features of an object for purposes of classification, and analyzing the one or more sensed features to determine if the object can be accurately classified (i.e. classified with a confidence in excess of a given threshold) into a given state. If, based on the analysis results, the object cannot be accurately classified, the feature analysis results in an "ambiguous" determination. The classifier is configured to traverse a graph to determine and select a next measurement sensor for sensing one or more additional features of the object. The graph may comprise state nodes that represent different characteristics or features to be sensed and links between nodes that represent logical connections between different sensed characteristics. Traversal of the graph includes determination of information relevant to the particular region of ambiguity associated with the object likely to reduce and/or eliminate the ambiguous region, and therefore permit accurate classification of the object. Factors including resource allocation, sensor measurement and/or classification time constraints, feature relevance, accuracy and cost, are accounted for in generating the graph data structure. The determination and selection of next sensor measurement is accomplished according to the graph data structure and the features are sensed and analyzed using the current sensor. The feature results are analyzed in conjunction with the initial analysis results and determination associated with the first sensed features. The results of the analyses of the features associated with the first and second sensor measurements are fused using well known convex hull techniques to thereby determine a reduced region of ambiguity for purposes of classification. If the region of ambiguity is such that the object still cannot be accurately classified, the process of determining and selecting sensor and sensor measurements for feature extraction according to the graphical data structure, analysis and fusing of the now current sensor feature results with the previous feature measurement results, is repeated.

This process of dynamic sequential sensor determination and selection, capture of information, graphical depiction and discernment of overlap for regions of ambiguity using convex hulls, is performed until a classification is arrived at with the requisite degree of confidence.

In one embodiment, a system and method for classifying unclassified vehicle tracks using sensor data may comprise acquiring a computer database of vehicle track characteristics data for certain vehicle tracks; defining vehicle track signatures based on the vehicle track characteristics data; and generating a graph based on the vehicle track signatures, the graph having state nodes representative of distinguishing vehicle track characteristics defined in the vehicle track signatures and links between the state nodes representative of relationships between distinguishing vehicle track characteristics defined in the vehicle track signatures, the graph also having reporting nodes for classifying unknown vehicle tracks when sufficient distinguishing vehicle track characteristics have been observed, independent of a parametric model of the distributions of class-conditional probability. The method may also comprise processing with the graph, using a processor, sensor data corresponding to a first unclassified vehicle track until the first unclassified vehicle track is classified.

The step of defining vehicle track signatures comprises: identifying in the computer database the distinguishing vehicle track characteristics for at least some of the known vehicle tracks; and prioritizing the distinguishing vehicle track characteristics for at least some of the known vehicle tracks, wherein the prioritizing comprises defining relationships between the distinguishing vehicle track characteristics. In the method for classifying vehicle tracks, the vehicle track characteristics data may comprise at least one of speed, size, position, IFF status, heading, acceleration, airborne state, in motion state, operating altitude above or depth below sea level, likelihood of operating within a region of interest, acoustic response characteristics, electromagnetic emanation characteristics, kinematic maneuver characteristics, and electro-optic characteristics. In an embodiment, prioritizing the distinguishing vehicle track characteristics may further comprise prioritizing the distinguishing vehicle track characteristics and defining the reporting nodes. In an embodiment, defining relationships between the distinguishing vehicle track characteristics may comprise defining a relationship between the distinguishing vehicle track characteristics representative of the vehicle performing a known tactical maneuver. In another embodiment, defining relationships between the distinguishing vehicle track characteristics may comprise defining at least one relationship between a first vehicle track and a second vehicle track in which one of the vehicle tracks is for a vehicle capable of launching an attack weapon and the other of the vehicle tracks is for a launched attack weapon.

In an embodiment, the step of processing with the graph, using a processor, real-time sensor data comprises: receiving first real-time sensor data for an unclassified first vehicle track and passing the first initial real-time sensor data through an initial portion of the graph to determine a first current track state for the unclassified first vehicle track; determining whether one of the reporting nodes has been reached; and if one of the reporting nodes has been reached, classifying the unclassified first vehicle track; or if one of the reporting nodes has not been reached, receiving first updated real-time sensor data and passing the first updated real-time sensor data through an intermediate portion of the graph linked to a current track state to determine an updated first current track state, until one of the reporting nodes is reached and the unclassified first vehicle track is classified. In an embodiment, prioritizing the distinguishing vehicle track characteristics further comprises prioritizing the distinguishing vehicle track characteristics and defining the reporting nodes without requiring use of a parametric model of the distributions of class-conditional probability over the complete feature space.

BRIEF DESCRIPTION OF THE DRAWINGS

These and other features and advantages of the present invention will be more fully disclosed in the following detailed description, which is to be considered together with the accompanying drawings wherein like numbers refer to like parts, and further wherein:

FIG. 5c shows an exemplary block diagram of a computerized system according to an aspect of the disclosure.

FIG. 18 is a graph of projected length as a function of time (Principal Axis Tilt of 5 degrees).

DETAILED DESCRIPTION

Before embarking on a detailed discussion, the following should be understood. While embodiments of the disclosure illustrate dynamic discrimination and classification systems within the context of ballistic missile discrimination and processing, it is understood that such application is merely exemplary, and the present disclosure is not limited to ballistic missile applications. Rather, embodiments of the disclosure may be applied to radar and imaging systems, medical (e.g. EKG, EEG patient monitoring) and diagnostic imaging and testing security systems, including computer security, financial systems including stock price monitoring and price fluctuation analysis, and traffic monitoring systems, by way of non-limiting example only.

The process of determining whether an object belongs to one class of objects or another, based on features derived from any kind of measured data, is called feature-based classification. Ballistic missile discrimination is the process of selecting a lethal object from among several or many objects in a ballistic missile threat complex, based on measured data. It is most often sensible to make this decision based on estimates of multiple target attributes, called features, collectively representing vectors in an abstract feature space. In accordance with an aspect of the present disclosure, a classifier system and method is provided that utilizes feature information without requiring use of a parametric model of the distributions of class-conditional probability over the complete feature space, and which also has the ability to scale automatically to handle a feature space of any number of dimensions. Furthermore, there is disclosed herein a technique for operating the classifier dynamically in a way that ties automatically to sensor resource management.

Figure 1:
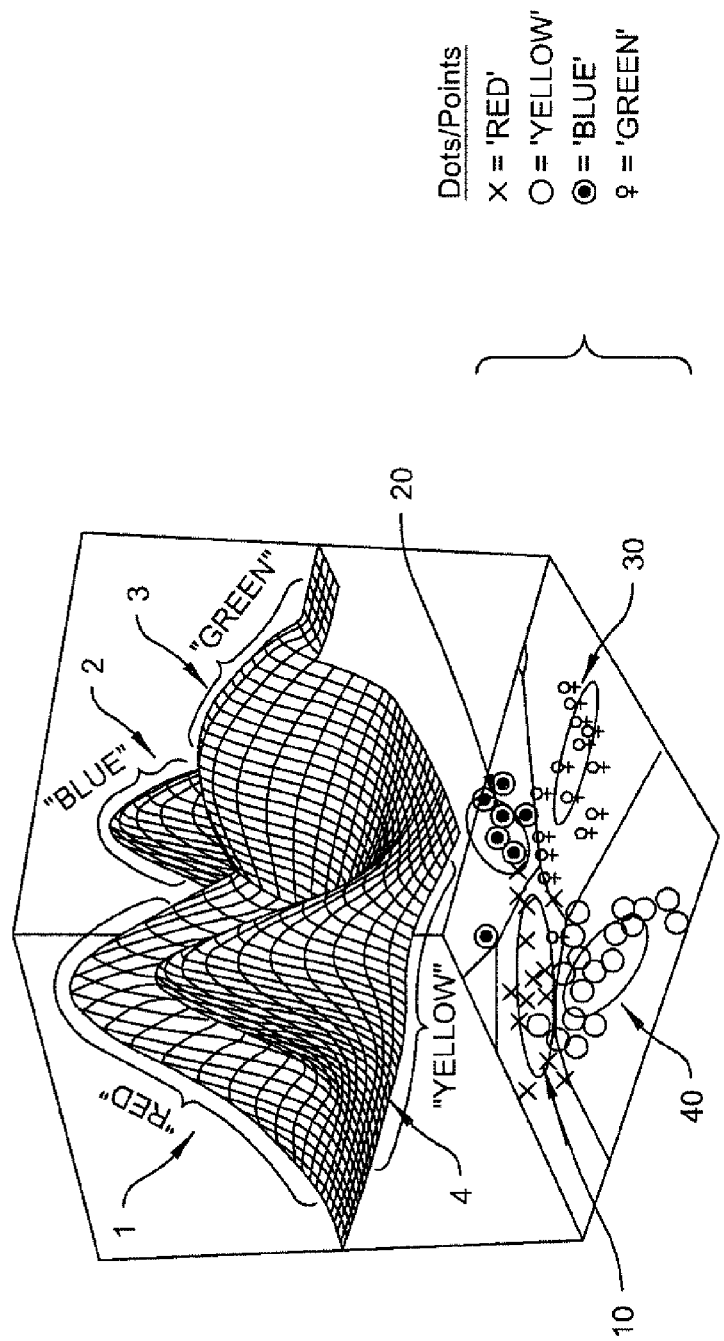
FIG. 1 is an exemplary illustration of probability density functions and class boundaries in feature space useful for describing aspects of the present disclosure.

Referring now to FIG. 1, there is shown exemplary probability density functions and class boundaries in feature space useful for illustrating the concept of feature-based classification for various features. The four continuous surfaces (labeled 1, 2, 3, 4 and representing colors "red", "blue", "green", and "yellow", respectively) in FIG. 1 represent the joint class-conditional probability densities that an object of known class C will exhibit the features represented by a given point in the two-dimensional feature plane (projected below) whose x and y axes represent the values of the two features. In the example, there are four classes, represented by the four surface designations. This approach may be extended without difficulty to any number of dimensions (features) and any number of classes, however one's ability to make a visualization like the one shown in FIG. 1 is generally limited to two (or at most three) dimensions. The ability to perform feature-based classification in a space of arbitrarily many dimensions is of great importance, since it is often the case that the objects can potentially be distinguished by a number of generally independent attributes. Also, one can only attempt by good design to construct features that estimate various object attributes, and it is often desirable to keep a redundant number of features in the picture, since the actual independence of those features is an empirical question answered by determining whether the class-conditional densities can be written as simple products of one-dimensional (marginal) densities. As long as that is not strictly the case, there is additional value in keeping both features.

The question of how to make the class decision that provides the greatest likelihood of choosing correctly (e.g. identifying an object drawn from the "red" distribution (i.e. the distribution labeled 1) as "red") for a fixed likelihood of choosing incorrectly (identifying an object drawn from one of the other colored probability densities (i.e. 2, 3, or 4) in the Figure as "red") for a static case like the one illustrated is answered by forming the (posterior) probability P(C|x, y) that the object really belongs to class C and not one of the other classes, given the observed features and their corresponding class-conditional densities. According to Bayes' rule of probability, it is $$P(C \mid x, y) = \frac{P(C)p(x, y \mid C)}{\sum_{C'} p(C')p(x, y \mid C')} \quad (1)$$

Here p(C') represent the prior probability that the object was of one class or the other (as from another independent source). Given no such prior information, it may be best to assume these prior probabilities are all equal, so that they can be omitted from Equation 1. The quantity P(C|x, y) has the property that it reduces the two features (x, y) to one single combined feature P that can be thresholded to make a final class decision. In general, one can specify a separate threshold for each of the classes in a multi-class situation, to meet specified probabilities of making any one of the possible types of false call (e.g. calling an object that is really yellow red). Once these thresholds have been set, we have defined the elementary machine that makes the decisions. The actual nature of this final decision machine is encapsulated by the boundary regions 10, 20, 30 and 40 shown in the projected feature plane. The principle is the same in a space of any number of features, but the boundaries become surfaces or hyper-surfaces that cannot be visualized except by analogy with the two- and three-dimensional cases.

Once constructed, the computerized classifier consists (at run time) of a set of exclusive regions in the feature space (here the plane) defined by a set of class boundaries, as illustrated. The application of the classifier is first to calculate the features (x, y) from the sensor measurements, then to make a class assignment based on the region in which the feature vector falls. To each possible set of class boundaries, and each feature space, there corresponds a unique elementary classifier.

The operation of the classifier is also indicated in FIG. 1. The colored points in the feature plane below the surfaces correspond to feature vectors drawn at random from the four colored class-conditional distributions, which is assumed to be the way the feature vectors will come out statistically when measurements are made on real objects taken from the different classes. Most of the "red" dots occur in the region designated red (i.e. region 10), however, a few fall in the other regions (i.e. regions 20, 30, 40, associated with "blue", "green", and "yellow" regions, respectively). The red dots that fall in the red region are the correct decisions, and the red dots that fall in the other regions are the false calls or false alarms. The benefit of the classifier based on Equation 1 above all others is that it makes the most correct calls for a fixed number of false calls. It is, however, useful to recognize the idealizations that go into applying Equation 1 to determine the class decision boundaries in the feature space.

First, it will be noted that the continuous class-conditional densities shown as the colored surfaces are tacitly assumed to be known exactly. In practice, however, estimates of these surfaces from a scatter of state vectors are obtained either from real experience with objects of known kind, or from simulation (e.g. based on empirical data). Those are the scatters of colored points shown in the figure. So it is the finite scatters of points in feature space that are really known, and not the continuous surfaces. This estimation process presents an immediate difficulty, since it is rare to encounter an object of one class with features corresponding to a region in feature space where the class-conditional density is small. It is rare, for example, to encounter a red dot very far from the peak of the red distribution illustrated in FIG. 1, or a green dot very far from the peak of the distribution shown in green. What is worse, the regions in which two distributions overlap for an effective (well separated) set of discrimination features are precisely the regions in which there are few or no experiences on the basis of which to estimate the probability surface. This practical difficulty can lead to confusion of the classes.

A related problem is that, in order to form a continuous model from a finite set of samples as needed to carry out the program, it is in general necessary to have an idea of the geometrical properties of the surface. In practice, this means that the class-conditional surfaces are assumed to have a certain shape that can be captured by specifying a finite set of parameters. The surfaces shown in the Figure are products of one-dimensional Gaussian distributions of different widths, centered on specific points in the plane and then rotated around. Such a distribution is specified by a set of five parameters. It is said to be parametric.

As long as (1) the number of available samples is much greater than the number of parameters (e.g. much greater than five) and (2) that the parametric model (here two-dimensional Gaussian) faithfully models the distribution, the use of the parametric model is justified. But in a feature space of dimension greater than three, it is difficult to determine whether a certain model matches the data even roughly. Moreover, there are no general techniques available for determining the parameters of a general parametric model automatically from sample feature vectors. It is common in this case to resort to the use of a particular model (e.g. multivariate Gaussian) for no better reason than that it is tractable to estimate the model parameters from a set of data. In such a case, the exactness of Equation (1) is of little significance, and one might do better to simply draw decision boundaries by hand. Indeed, this is one way to construct a classifier, but it is applicable only in two dimensions.

Within this context, the present disclosure provides a computer classifier structure that acknowledges that the raw data experiences on which the classifier is to be based are finite in number, and proceeds directly from the finite scatter of data points as illustrated above to a classifier structure or set of decision boundaries without the intermediate step of fitting the data to a surface, or estimating class-conditional probability densities. This disclosure describes embodiments of a system and method that is both non-parametric (not depending on any model of the underlying probability densities) and also immediately extensible to feature spaces of any number of dimensions. Furthermore, the disclosure provides for a hierarchical multi-classifier implementation that is ideally suited to operate under the conditions imposed by finite time and limited sensor resources. This hierarchical, graphical nature makes the scheme especially suitable to the problem of projectile classification such as ballistic missile discrimination.

Figures 2, 3:
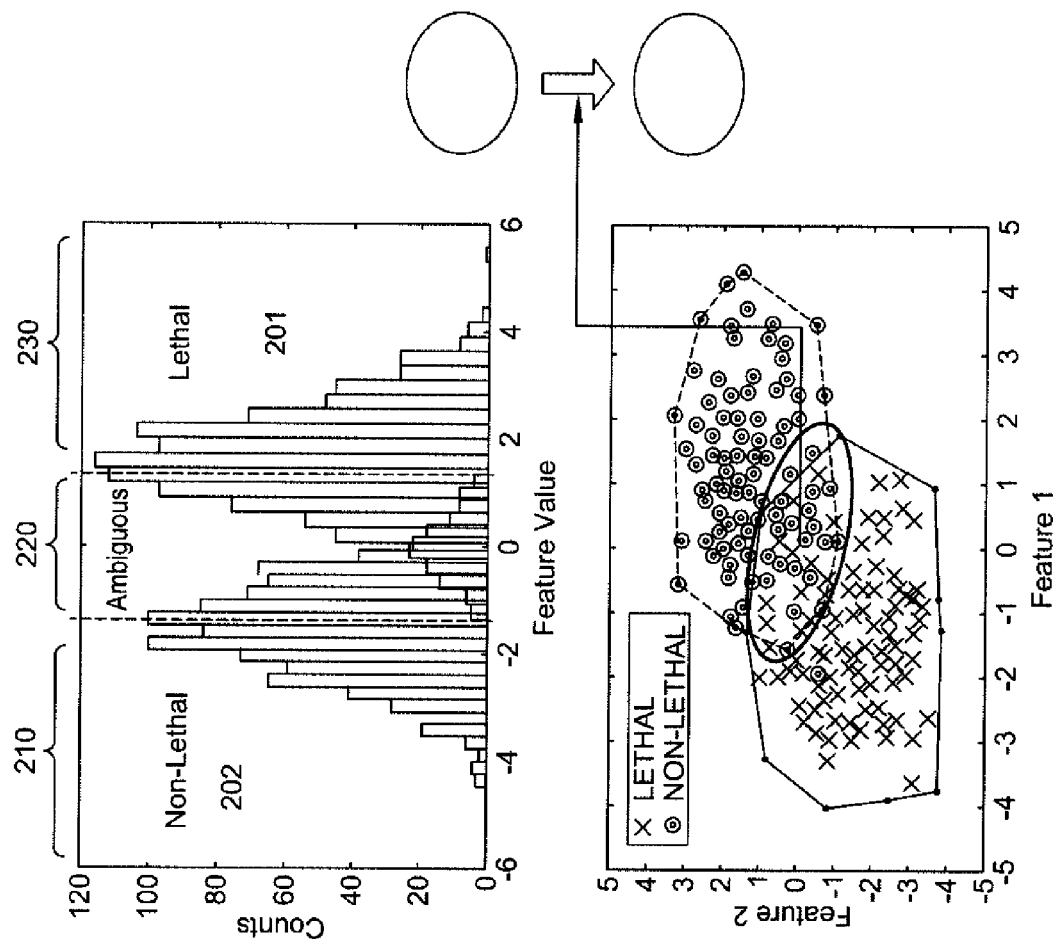
FIG. 2 is an exemplary illustration of probability distributions (histograms) for a single feature useful for describing aspects of the present disclosure.
FIG. 3 shows the concept of a region of ambiguity extended to two classes in two dimensions.

FIG. 2 illustrates the general features of empirical one-dimensional class probability densities that are constructed using only a finite number of samples. The histograms represent empirical experience (training data) drawn from each of two classes, labeled as 201 (lethal or "L") and 202 (nonlethal or "N"). The feature space can be divided into three regions 210, 220, and 230. The region 230 on the right represents the portion of feature space where only lethal objects have ever been seen in the training data. Region 210 on the left represents the portion of feature space where only non-lethal objects have been seen. Region 220 in the center represents that portion of feature space in which objects of both kinds have been seen (i.e. overlapping region). Since the data upon which the classifier is to be based are finite in number, a pragmatic view is that a feature vector falling in the region 230 is certainly lethal and one falling in the region 210 is certainly non-lethal. This decision rule is justified by the fact that there are only a finite number of training samples. The dynamic classification system and method of the present disclosure operates on a feature vector that falls within the middle region 220, otherwise known as a region of ambiguity.

According to an aspect of the disclosure, a computerized method uses convex hull techniques to determine a region of ambiguity by calculating the intersection between the smallest polygon that contains all of the observed data from one class and the smallest polygon that contains all of the training data from another class. FIG. 3 illustrates the case for two classes in two dimensions.

It is understood that the smallest convex polygon that completely encloses a set of points in two dimensions generalizes to sets of points in a feature space of any number of dimensions. Algorithms exist for calculating the convex hull corresponding to a set of points (feature vectors) in a feature space of any dimension, calculating the volume or generalized volume of a hull, and determining whether a given point is inside or outside a convex hull. A classifier according to the Bayesian classifier embodied in Equation 1 has an apparent advantage over one which goes directly from the measured data to surfaces in feature space. By combining all of the discrimination features into a single quantity P, it is possible to vary the threshold continuously from zero to one, and in that way continuously control the balance between probability of correct calls and probability of false calls. This balance is struck in the present invention by the following mechanism. It is possible to automatically expand or contract the polygon as in FIG. 3, representing the decision surface, by including or deleting measured feature vectors not enclosed by the polygon or hull, or by removing vectors from the hull. The procedure for doing this is as follows.

1. Consider each of the points constituting the boundary of the surface (e.g. polygon) in turn.
2. Calculate the area of the polygon that results from removing the boundary point.
3. Remove the boundary point that reduces the area of the polygon by the smallest amount.

An analogous technique may be used to expand the size of the class region (by adding points in the surrounding region in order, based on which one increases the area of the polygon by the smallest amount). The added points could be chosen specifically from a particular volume of ambiguity or from among all the points, depending on the desired effect. The deleted points might likewise be chosen from among points in the volume of ambiguity or from all points. This technique of expanding and contracting the class regions in feature space to balance probability of false alarm and probability of correct call can be applied equally well in a feature space of any dimension, by replacing the polygon in FIG. 3 with a convex hull in any arbitrary dimension. The numerical tradeoff between probabilities, sometimes called the confusion matrix, is controlled by automatically expanding or contracting the decision boundaries, instead of by sweeping a single threshold, as in the case of a classifier that employs the intermediate step of forming parametric class-conditional probability functions. It is known in the art of radar signal processing and object determination and discrimination that confusion matrices such as an RF and IR confusion matrix may be generated to provide an indication of the above-identified conditional probabilities, as described for example in co-pending commonly assigned U.S. patent application Ser. No. 13/243,162 EXPLICIT PROBABILISTIC TARGET OBJECT SELECTION AND ENGAGEMENT the subject matter therefore incorporated by reference herein in its entirety.

A hierarchical classifier according to an aspect of the disclosure comprises a pre-processing phase, where the convex hulls corresponding to classes are pre-computed and then arranged into a graph data structure, and a run-time phase where the graph is traversed to identify which measurement types should be used to disambiguate the discrimination candidate. In this manner, ballistic missile discrimination is accomplished for a given object by analyzing multiple features and then fusing the results of the analyses of these features using a convex hull process. The convex hull represents the smallest surface containing a given set of points, where for any two points in the set A and B, the line segment AB is also contained within the surface. If the fused features produce orthogonal results, this will reduce the ambiguity region, thereby accurately discriminating more objects than would be possible by analyzing a single feature.

Figure 4:
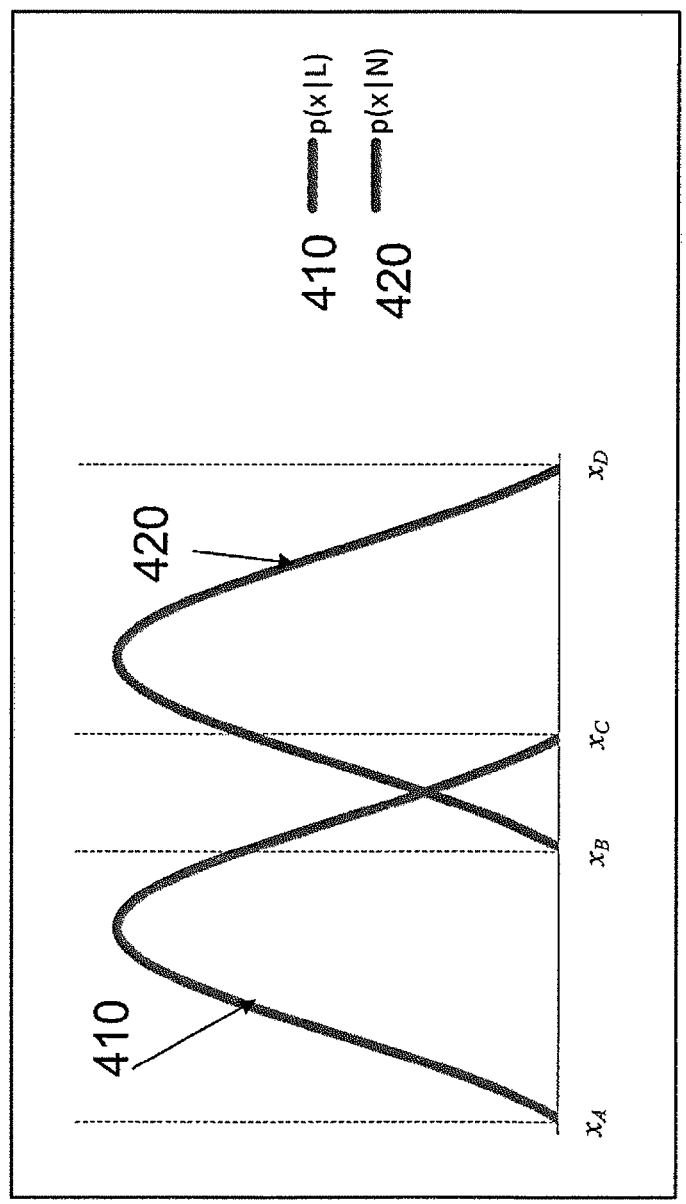
FIG. 4 shows a plot of probability distributions for a single feature useful for describing aspects of the present disclosure.

FIG. 4 shows two probability distributions (410, 420) representing the likelihood of an object correctly identified as being a member of the Lethal class, shown as p(x|L), and correctly identified as being a member of the Non-lethal class, shown as p(x|N), based on the discrimination results for a single feature.

The horizontal axis indicates the calculated value x for a particular feature f obtained from measurement m of the object. The Figure has three principal regions for x: 1) from $x_A$ to $x_B$, where it is highly likely that the object is a member of the Non-lethal class; 2) from $x_C$ to $x_D$, where it is highly likely that the object is a member of the Lethal class; and 3) from $x_B$ to $x_C$, where it is ambiguous whether the object is Lethal or Non-lethal.

Figure 5A:
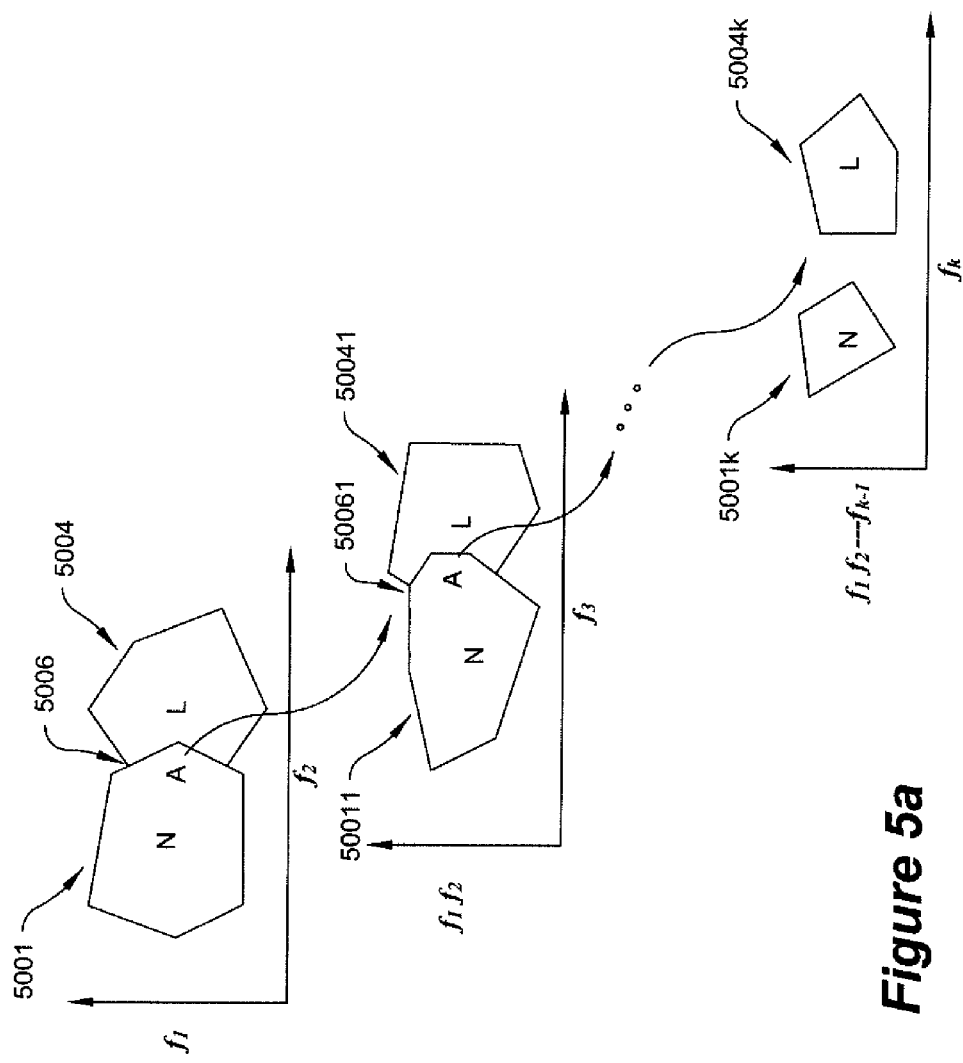
FIG. 5a shows a sequence of probability distributions after fusing multiple features and sequential reduction of the region of ambiguity A using the convex hull technique.

One can then fuse measurements of different features in an effort to reduce ambiguity regions, as shown in FIG. 5a. The results of analyzing the first feature, $f_1$ are fused with the results of the second feature, $f_2$. There can be three types of results: 1) that the object is a member of the Non-lethal class "N", shown in the dark area 5001; 2) that the object is a member of the Lethal class "L", shown in the light area 5004; or 3) that it is ambiguous whether the object is Lethal or Non-lethal, shown in the gray intersection area "A" labeled 5006. If the result of fusing $f_1$ and $f_2$ is determined to be ambiguous, the intersection area $P(L|f_1,f_2)$ is then fused with the results of feature $f_3$. Once again, there can be three types of results: 1) that the object is a member of the Non-lethal class, shown in the area labeled 50011; 2) that the object is a member of the Lethal class, shown in the area labeled 50041; or 3) that it is ambiguous whether the object is Lethal or Non-lethal, shown in the intersection area 50061. As suggested by the Figure's ellipsis, the discrimination of the ambiguity region labeled throughout as "A" can continue until the object's class is unambiguously resolved. This final resolution is seen in the bottom graph of FIG. 5a, where features $f_1 f_2 \ldots f_{k-1}$ are fused with feature $f_k$, producing only two types of results: 1) that the object is a member of the Non-lethal class N, shown in the darkened area 5001k; or 2) that the object is a member of the Lethal class L, shown in the lighter area 5004k, thereby resolving the ambiguity region.

To be effective, discrimination techniques must strike an appropriate balance between rejecting objects that are members of the class, and of including objects that are not members of the class. The present disclosure accomplishes this by mapping into a graph data structure a set of prescribed measurement combinations and possible analysis results. As applied to a ballistic missile discrimination solution, the graph is a collection of nodes representing discrimination states, edges connecting the nodes indicating valid discrimination state transitions, and functions indicating the behaviors used to determine which if any state transitions should occur as the result of the current measurement interpreted in the context of the current state (which current state was arrived at as a result of all of the previous measurements and analyses of the object in question). A single graph may be used to represent all of the discrimination states, with the graph indicating all of the permissible transitions between states. For each object being discriminated, the graph will be traversed from one state to another until a discrimination result is declared.

Figure 5B:
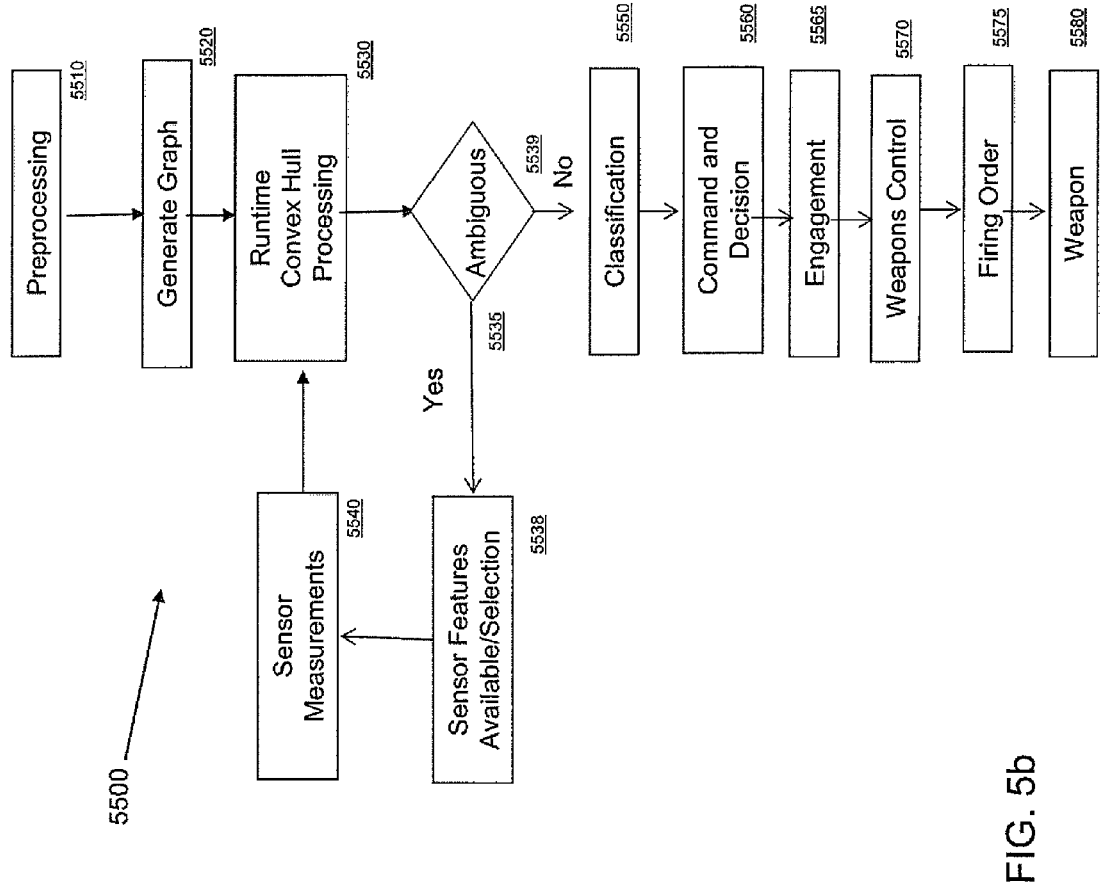
FIG. 5b shows an exemplary schematic process flow according to an aspect of the disclosure.

FIG. 5b shows a high level flow 5500 of a computerized classifier which includes a preprocessing step 5510 where convex hulls corresponding to classes are pre-computed and arranged into a graph data structure as indicated above, where data characteristics unique to particular vehicles can be used to distinguish and identify a vehicle with an acceptable degree of certainty are identified and defined. That is, characteristics are identified that can be measured by the system's sensors and that can be used to identify and uniquely distinguish, for example, a vehicle track's classification. The characteristics are used to create a graph at step 5520. Examples of features or characteristics include speed, size, position, IFF status, heading, range, velocity and acceleration, vertical acceleration, target length, airborne state, in motion state, operating altitude above or depth below sea level, likelihood of operating within a region of interest, acoustic response characteristics, electromagnetic emanation characteristics, kinematic maneuver characteristics, and electro-optic characteristics, by way of non-limiting example. This database may typically have sensor data from previous engagements in which vehicles (which may be aircraft, missiles, ships, underwater threats, space threats, or any type of object or threat) have been tracked, and the sensor data associated with the tracking and the ultimate identification/classification of the vehicle. From this data, certain characteristics of various vehicles may be ascertained, such as, for example, the size of the vehicle, the maximum speed of each vehicle, and the acceleration characteristics of each vehicle. Alternatively, a computer database may be based on known characteristics of various vehicles gathered from intelligence reports or other types of reports that are not necessarily based on previous tracking data, for example a reference book that discloses characteristics of various vehicles such as their size and speed.

Run-time processing 5530 is performed using real-time sensor measurement data 5540 and using the graph generated in step 5520. The processing may be started using a trigger or external signal and the graph data structure is traversed to identify which measurement type(s) should be used to reduce the ambiguity or uncertainty (i.e. disambiguate) associated with a discrimination candidate. A classification step 5550 is arrived at through the real-time processing 5530, whereby the ambiguity has been resolved to a sufficient degree for the particular application. Note that the run time processing iteratively determines, based on the sensor measurements of feature data, whether the ambiguity or overlap of distribution regions among the finite scatter of data points in feature space is sufficiently great to result in a determination of "ambiguous" (step 5535). Upon the occurrence of this condition the computerized process continues to step 5538 where another sensor is selected for measurement of additional feature data, according to the graph data structure and taking into account the particular region of ambiguity, as well as additional feature data being received and processed (e.g. from previously tasked sensors), time constraints, sensor availability, and relevant feature data expected to reduce and/or resolve the area or region of ambiguity. This process continues until the ambiguity is resolved (5539) and appropriate classification is achieved 5550. By way of non-limiting example, the computerized system may send classification information to a command and decision step 5560. At the command and decision step, an engagement order 5565 may be issued to a weapons control system 5570. Then, the weapons control system 5570 may issue a firing order 5575 to a weapon 5580.

According to another aspect of the present disclosure, a computerized system 500 for executing the method described herein is schematically illustrated in FIG. 5c. The system 500 comprises a computer processor 520 which receives sensor measurement data or feature data 515 via sensors 510. In the illustrated example where an interception of an incoming ballistic missile is monitored by the system 500, the sensor data may be from various sensors associated with a radar system for tracking and monitoring an incoming ballistic missile and sensing one or more characteristic feature data related to the target incoming ballistic missile. The computer processor system 520 that receives the feature data 515 from the sensors 510 is preferably configured and adapted to execute a computer program code which when executed by the computer processor system 520, the computer processor system 520 performs the method for classifying an object or target incoming ballistic missile being monitored.

More particularly, the computer processor system of the present disclosure is configured to traverse a graph to determine and select a next measurement sensor for sensing one or more additional features of the object. The graph may comprise state nodes that represent different characteristics or features to be sensed and links between nodes that represent logical connections between different sensed characteristics. Traversal of the graph includes determination of information relevant to the particular region of ambiguity associated with the object likely to reduce and/or eliminate the ambiguous region, and therefore permit accurate classification of the object. Factors including resource allocation, sensor measurement and/or classification time constraints, feature relevance, accuracy and cost, are accounted for in generating the graph data structure. The determination and selection of next sensor measurement is accomplished according to the graph data structure and the features are sensed and analyzed using the current sensor.

The feature results are analyzed in conjunction with the initial analysis results and determination associated with the first sensed features. The results of the analyses of the features associated with the first and second sensor measurements are fused using the convex hull technique to thereby determine a reduced region of ambiguity for purposes of classification. If the region of ambiguity is such that the object still cannot be accurately classified, the process of determining and selecting sensor and sensor measurements for feature extraction according to the graphical data structure, analysis and fusing of the now current sensor feature results with the previous feature measurement results, is repeated. This process of dynamic sequential sensor determination and selection, capture of information, graphical depiction and discernment of overlap for regions of ambiguity using convex hulls, is performed until a classification is arrived at with the requisite degree of confidence.

The system 200 may include a user interface device 230 for displaying, printing, or otherwise delivering the output of the method of the present disclosure to a user of the system. In one exemplary embodiment, the computer processor system 220 is provided with one or more data storage devices necessary for operation of a typical computer processor system as well known in the art. The computer program code can be tangibly embodied in a machine-readable storage medium 250 as a software and loaded on to the computer processor system 220 or the computer program code can be provided in the computer processor system 220 as a firmware. Such computer-readable storage medium 250 can be a random access memory device, a read only memory device, a magnetic medium such as a hard-drive or a floppy disk, or an optical medium such as a Compact Disc, a DVD, etc.

Figure 6:
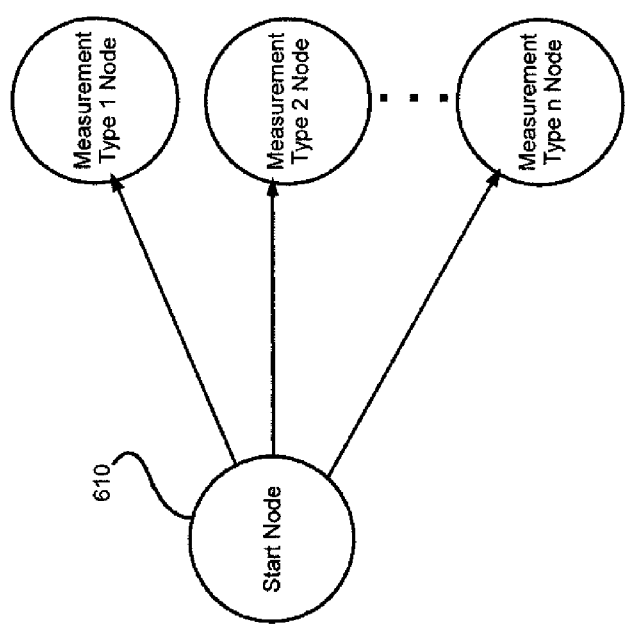
FIG. 6 is a schematic diagram of a graph showing Start and Measurement nodes implementing an aspect of the present disclosure.

As shown in FIG. 6, for each object to be discriminated, graph traversal begins at the graph's Start Node 610. It will be assumed that a given object's initial discrimination measurement type will be variable, depending on factors such as measurement resource availability, measurement cost, anticipated threat type, and previously-observed threat characteristics. The measurement type will be selected at the Start Node, at which point a command indicating the selected measurement type will be sent to a measurement scheduler, and the graph will be traversed from the Start Node to the selected Measurement Type Node to await the object's measurement results. The portion of the graph running from the Start Node to its associated Measurement Type Nodes is shown in FIG. 6.

Figure 7:
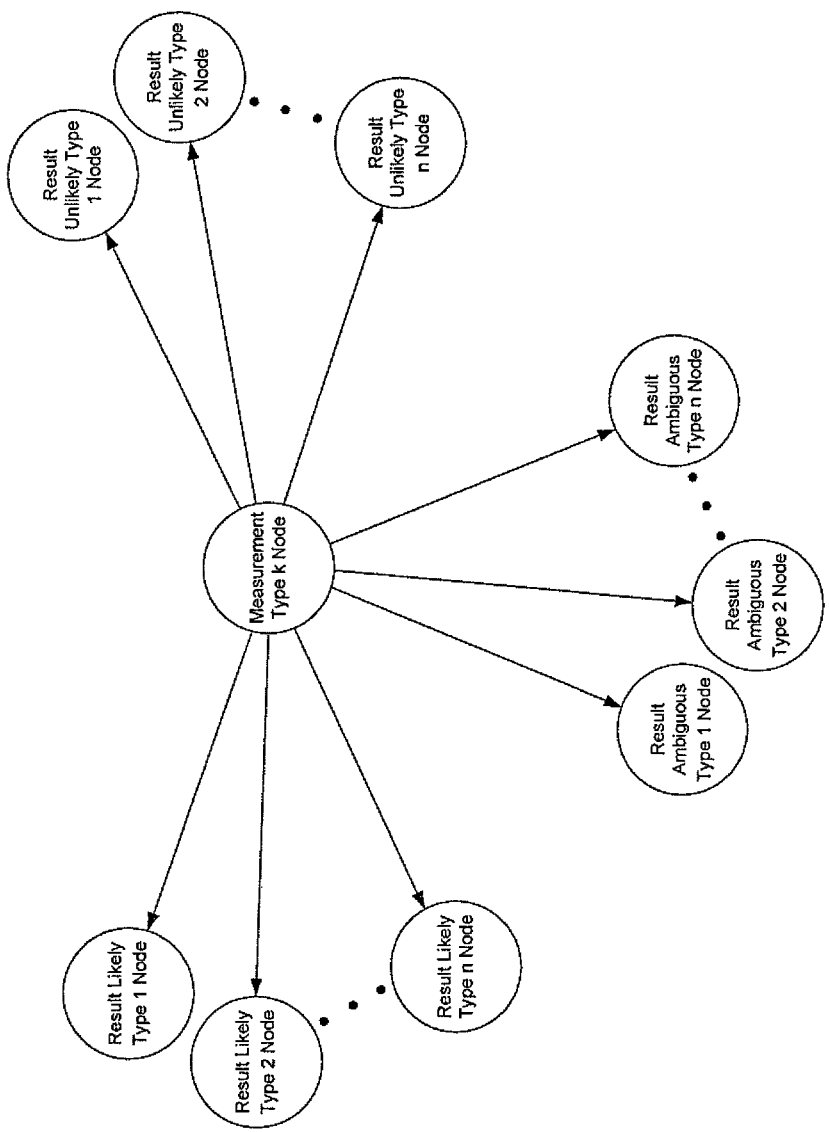
FIG. 7 is a schematic diagram of a graph showing Measurement and Result nodes implementing an aspect of the present disclosure.

When the object's measurement results are received, the measurement will be analyzed, and the result of this analysis will be examined to determine which edge emanating from the current node will be used to traverse the graph to the next node. The measurement analysis will have, at a minimum, the three principal result types described above in the context of single-feature analysis: 1) that it is unlikely that the object is a member of this particular class; 2) that it is likely that the object is a member of this particular class; and 3) that it is ambiguous whether the object is a member of this particular class. For any of the three principal result types of likely, unlikely, and ambiguous, these categories may be further subdivided as appropriate, based on the ability to do so quantitatively using the measurement analysis results. For example, in the case of a particular measurement, it may be possible to have two or more types of ambiguity results, with each of these result types being more favorably disposed to object ambiguity reduction by the use of different measurement types, as indicated in different measurement cost and benefit weights. In these cases, even though the principal result type might be the same, the graph would be traversed to different nodes depending on result sub-type. The portion of the graph running from the Measurement Type Node to its Result Nodes is shown in FIG. 7.

Figure 8:
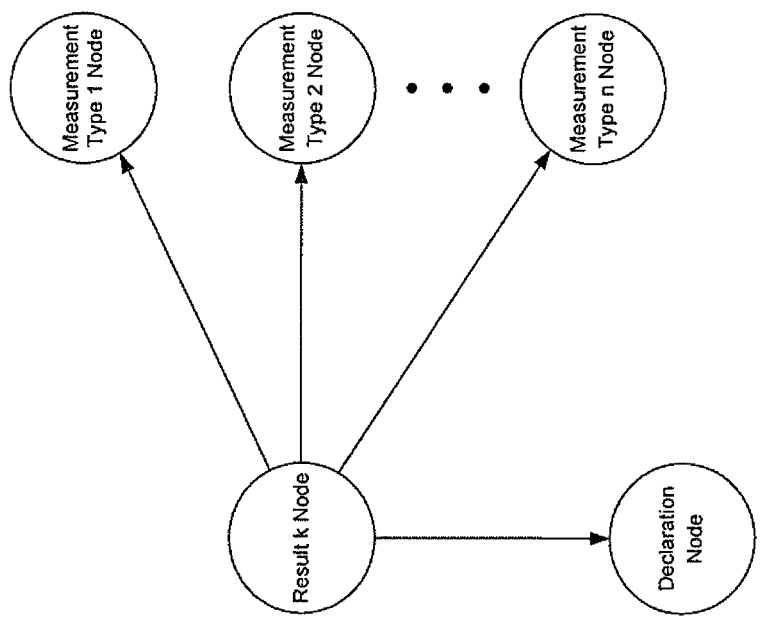
FIG. 8 is a schematic diagram of a graph showing Result, Measurement, and Declaration nodes implementing an aspect of the present disclosure.

For ambiguous results, the graph will identify measurement techniques for reducing the ambiguity, as well as the results analysis criteria used to determine the next path to traverse through the graph. Depending on the need for accuracy of discrimination results, either in general or for particular sets of results, the likely or unlikely result nodes may lead to confirmation measurement states intended to increase the confidence of results. Eventually, the graph will be traversed to reach a discrimination declaration node, which declaration node is reached after a traversal of the graph has followed a path that establishes a discrimination result for the object in question to a desired level of confidence. Upon reaching a declaration node, the object's class is declared, which declaration is then used in targeting decisions. The portion of the graph from a Result Node to Measurement or Declaration Nodes is shown in FIG. 8.

The Start and Result Nodes will contain one or more measurement type recommendations to be considered in requesting the next measurement of the object. The recommended measurements are those that can be used either to reduce object class ambiguity, or to increase class membership confidence. In a preferred embodiment of this solution, the recommended measurement types will be associated with weights for the measurement cost, meaning the impact on measurement resources, and the measurement benefit, meaning the potential for ambiguity reduction through the use of that measurement. These weights would be assessed in this embodiment in accordance with the technique disclosed in commonly assigned U.S. Pat. No. 8,098,183 entitled Priority Delivery Apparatus and Method, the subject matter incorporated herein by reference in its entirety, to optimize the balance between measurement resource utilization and object class ambiguity reduction.

Figure 9:
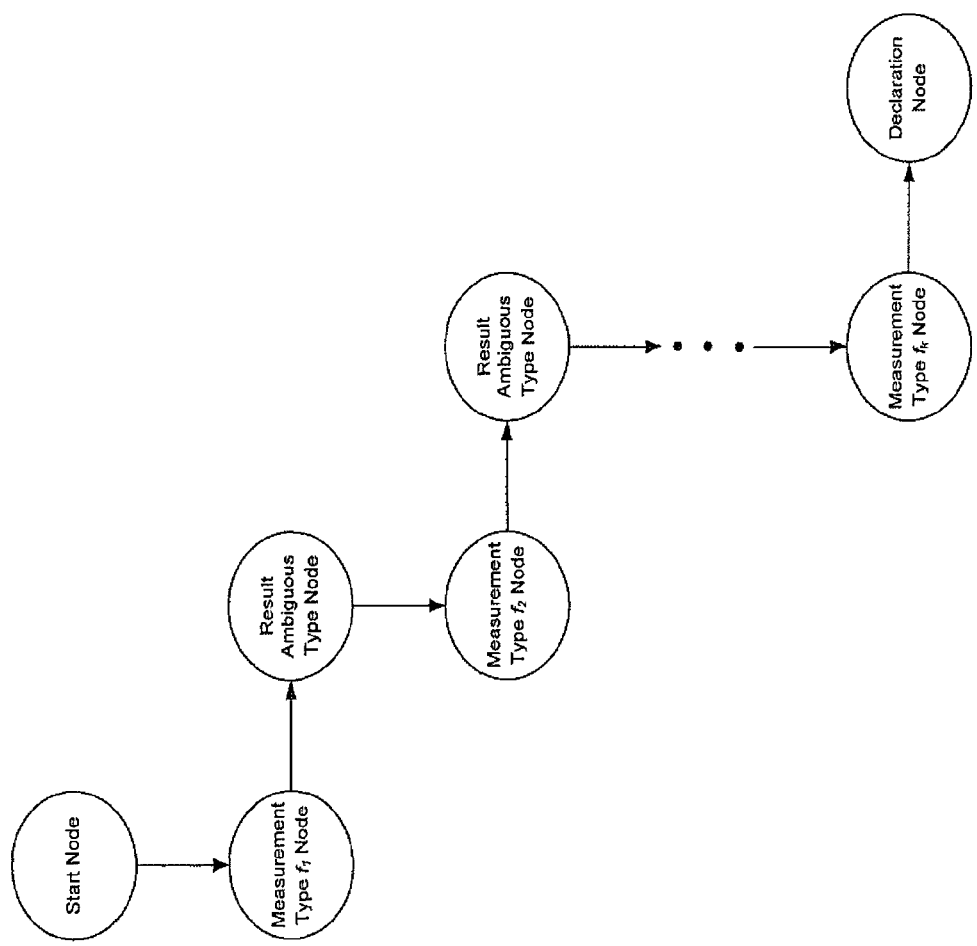
FIG. 9 is a schematic diagram showing Notional Graph Transitions implementing an aspect of the present disclosure.

The graph therefore consists of a Start Node, one or more levels of Measurement and Result Nodes, and finally Declaration Nodes. For a given object to be discriminated, the discrimination process starts with entry into the graph at the Start Node, with the graph then being traversed through one or more pairs of Measurement-Result Nodes, until finally a Declaration Node is reached, at which point an appropriate level of confidence has been reached allowing a discrimination class to be confidently declared for that object. A notional set of graph transitions representing the feature measurements of FIG. 8 is shown below in FIG. 9.

Example Configuration of Computerized Dynamic Classifier

Figure 10:
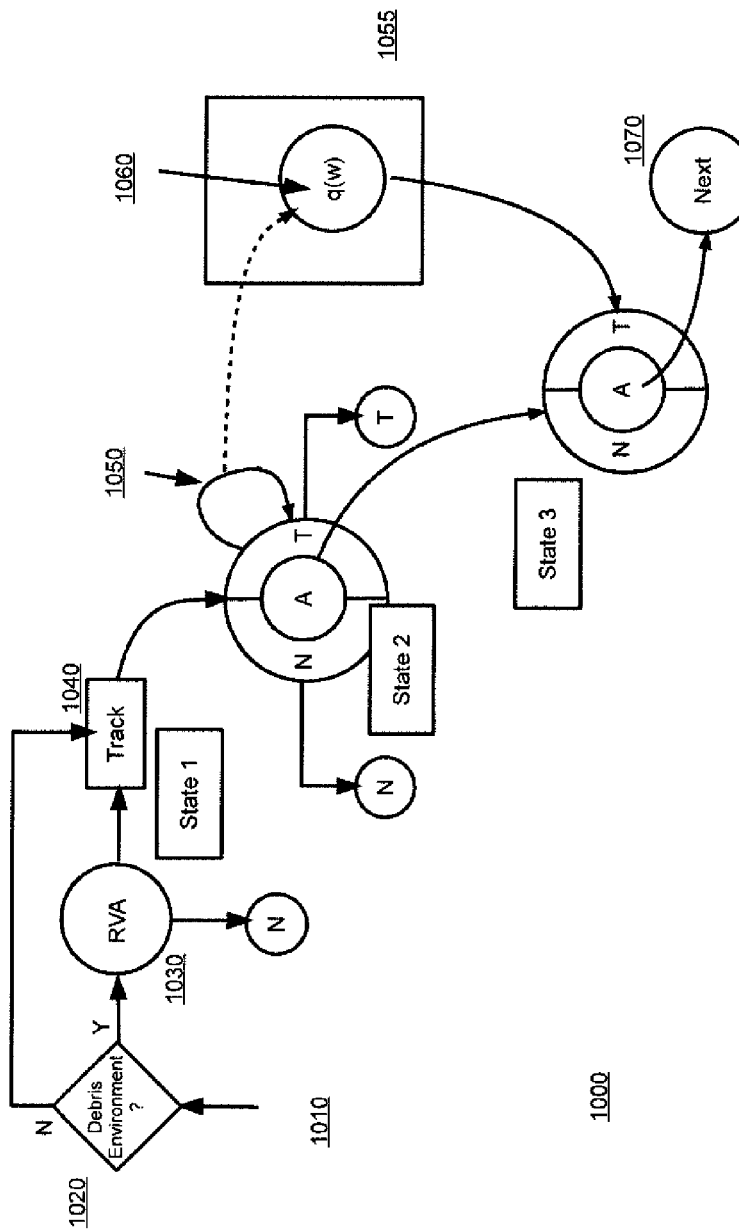
FIG. 10 is a schematic diagram of a configuration of a dynamic classifier system according to an aspect of the present disclosure.

FIG. 10 is an exemplary illustration of one particular embodiment of a computer implemented dynamic classifier 1000 that implements a graphical data structure and sensor measurement data for dynamic feature classification and resource management within a radar system without the use of a parametric model of the distributions of class-conditional probability over the feature space. An object or target is monitored for a duration of time in order to determine whether the target is in a particular state. By way of non-limiting example, in an engagement and intercept scenario for a hostile ballistic missile, a weapon system will typically track one or more ballistic missile objects using one or more radar sensors (e.g. RF, IR, acoustic, etc.). During that monitoring time, input feature data is received from an observed event. As shown in FIG. 10, the radar provides a trigger 1010 indicating whether the environment is characterized by a particular feature 1020 (identified in this example as debris corruption), and which is designated as a pre-track trigger. If this condition is met (1022), the system operates to process raw radar detections using a first sensor measurement and processing module 1030 and labeled (state 1) prior to performing track processing 1040. In this embodiment, the first sensor measurement and processing module 1030 is a range-velocity-acceleration (RVA/VA) screening algorithm executed prior to the track processing. A technique for implementing the RVA/VA imaging for debris mitigation embodied in module 1030 is described below in greater detail with reference to FIG. 11 in conjunction with FIGS. 12-14. If this condition is not met (1024), the detections are sent directly to the tracker. It is understood by one of ordinary skill in the art that a number of simple measurements are available once targets have been placed into track. These features are of a kind that are always available for processing on a per pulse basis and are combined into a classifier state labeled as state 2.

The classifier state 2 of FIG. 10 identifies schematically three regions of state space associated with the tracked object. These are: a threatening region T, a non-threatening region N, and an ambiguous region A. As discussed hereinabove, the measurement space of the computerized classifier is divided by convex decision hulls. It is to be understood that the three regions (N, T, A) shown herein are merely exemplary, as there may be more regions representing more classes and different types of ambiguities between classes, that may operate to trigger different state transitions.

The classifier state 2 of FIG. 10 further includes a recursive loop function 1050 indicating that elementary features can be continuously updated during this process to determine if one of the terminal nodes of the computerized classifier is reached. As time unfolds and the graph is traversed, certain sensor features designated as q(w) may or may not be available for selection and feature determination. For example, length and motion feature estimates of a target using radar processing techniques have the characteristic that they require a relatively long history of radar pulse data for their computation. Therefore, it is necessary to wait until the feature is ready for use before the state-based classifier can advance. A module 1055 configured to estimate rotational motion state and electrical length of a target for obtaining the relevant features q(w) is described in greater detail below with reference to FIG. 15 in conjunction with FIGS. 16-18.

As previously mentioned, the loop on state 2 indicates that the elementary features can be continuously updated during this process to see if one of the terminal nodes is reached. If not, availability of the features q(w) triggers the classifier to advance to state 3, which uses the newly available features q(w) possibly in combination with other features to perform the convex hull processing of state space associated with the tracked object to arrive at a reduced region of ambiguity and/or classification/discrimination decision. That is, the tracks individually advance through the graphical hierarchy of hull-based classifier nodes in this way in order to arrive at class decisions.

In this exemplary configuration, two types of trigger conditions are illustrated, an external environmental trigger 1010 that controls the flow of detections through or around the screener designated RVA 1030, and a trigger 1060 defined by the availability of the decision features q(w). Triggers of other types are also contemplated. A key feature of the dynamic classifier computer system is its ability to control resources by using only the features and processes (collectively, states) it needs to arrive at a confident classification.

Example Neural Adaptive Radar Signal Processing

In another embodiment, the classifier system and method disclosed herein may utilize a neural adaptive radar signal processing classifier in place of the non-probabilistic classification system disclosed herein, or as an additional classifier that may be invoked as part of a graphical data structure traversal as discussed herein with regard to FIG. 10 to address regions of ambiguity, and to arrive at a next classifier state (e.g. state 1070 labeled "Next" in FIG. 10) using a neural network algorithm prior to the classification.

According to an aspect of the present disclosure, a neural network classifier may use the above-described non-probabilistic classifier state vector path formulation as an input vector for employment to a neural network algorithm. The neural network algorithm is defined in computer executable instructions and employs artificial intelligence to signals delivered from radar sensors equipped for feature extraction and analysis. As networks do not require the elucidation of specific parametric reductions, it is unnecessary to independently define and process path or other information other than in the class descriptors. By way of example only, a neural network implementation may be configured to recognize and detect signal characteristics expected or easily observed by an analyst, and may utilize and indicate the presence of information that permits the solution of difficult computer discrimination problems, and hence serve as a discriminator itself or contribute to the improvement of other discrimination techniques.

One technique applicable to radar signal processing includes utilizing motion-invariant generalized coordinates to assign class designations to targets. The measured data contained in the data cube is represented by z(t,f,e) where the arguments are respectively the pulse time t, frequency f, and receiving element e of a coherent phased-array radar. A phase term $\phi(q,t,f,e)$ due to a remote scatter is dependent also upon a parameter q which describes the kinematic states of the scatterers, and by the motion of the transmitter and receiver represented by vectors T and R respectively which are omitted. The phase term is written as:

$$\phi(q, t, f, e) = -\frac{2\pi f}{c}[|T(t) - x(t|q)| + |R(t) - x(t|q)|] \quad (2)$$

Here x(t|q) is the position component of the kinematic state vector of the scatter at time t. An objective is to obtain a correct one-to-one mapping of true object class to designated class. That is, given true and assigned sets of target classes (labeled as $C_{true}$ and $C_{assigned}$) containing identical elements, the classifier system is configured and adapted to select $C \in C_{assigned}$ for a given target when and only when the true class is $C \in C_{true}$. The distinction is presented here because further development may address the knowing or unknowing correlation of non-equivalent true and assigned classes.

The combination of measurement and phase is the column vector $$|q,z\rangle = z(t,f,e)e^{-i\phi(q,t,f,e)} \quad (3).$$

where notational convention of the reference is retained.

Neural networks represent an approach to solving extremely complex classification problems which are particularly useful when the range of test data parameters are well-defined and stable. A potentially significant advantage is the ability of a neural network to determine relationships between data and output designations that are not readily apparent from standard analysis. One potential drawback is that the characteristics on which such correlation depends may not be robust, but due to local vagaries of the input data.

A variety of neural network implementations are available which include various training and supervised and unsupervised learning methods, but for current purposes of describing the implementation only a generic network is required. The generic neural network is described by a layer of input nodes Lin, a layer of output nodes Lo, and one or more layers of processing nodes corresponding to the type of network under consideration. In one of many potentially effective configurations the maximum cardinality of Lin is ntnfne which that of the vector |q,z>, while that of the output layer may be cardinality of the class set C. The training algorithm in this case may be established to minimize a specific (or perhaps multiple or overall) error in the pre-output layer with a selected metric such to the distribution of weights on this layer. For specific applications the posterior probability estimates P(Cj|Ck) for each of the true and assigned class pairs may be easily obtained from a sufficient set of training outputs. The network output may similarly be created such as the value is a direct measure of the training-based probability of correct class indicated by the node.

Given that imaging information is present by initial assumption, the output of the network may be easily configured to output spatial position rather than object class, or alternatively the probability of a given class of object may be mapped directly onto the position of the source on the image plane.

Velocity-Acceleration Image from Second Phase Differences for Debris Mitigation

Figure 11:
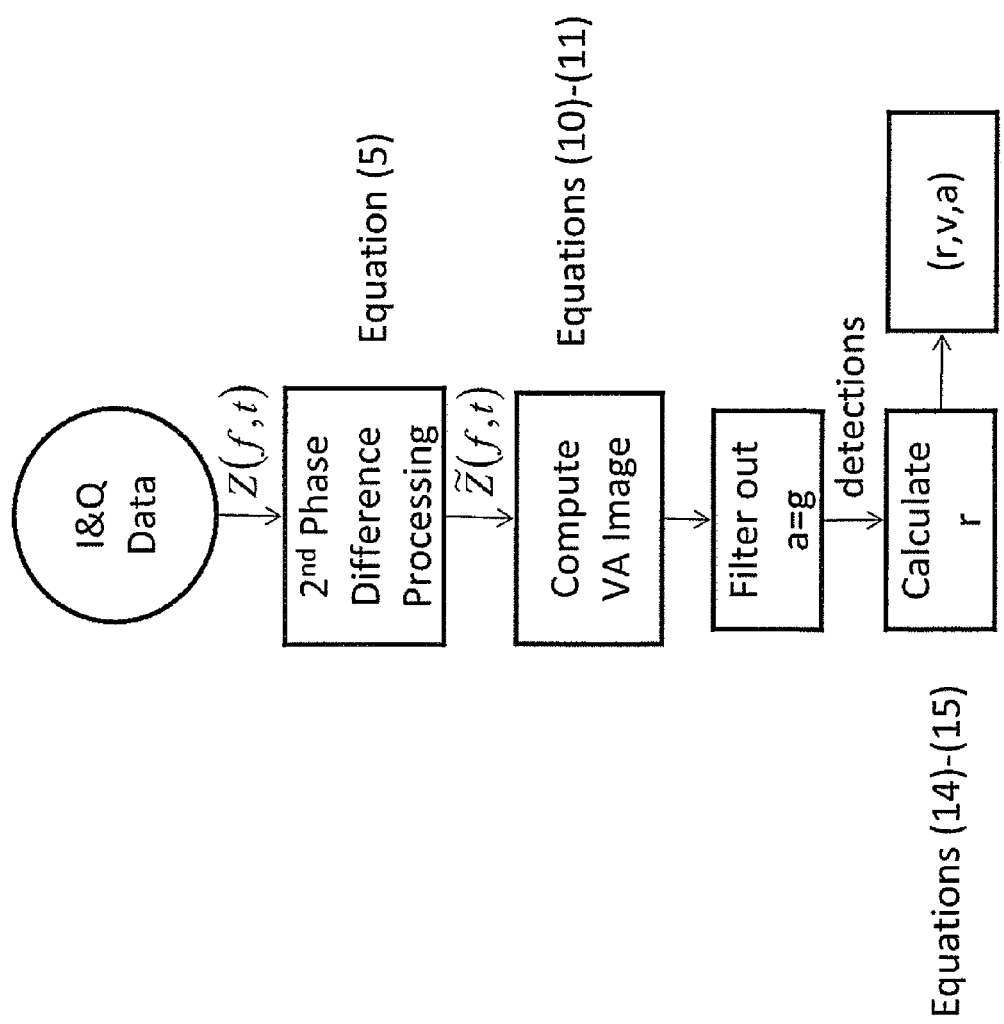
FIG. 11 is a schematic process flow diagram for velocity-acceleration imaging for debris mitigation according to an aspect of the present disclosure.
Figure 12:
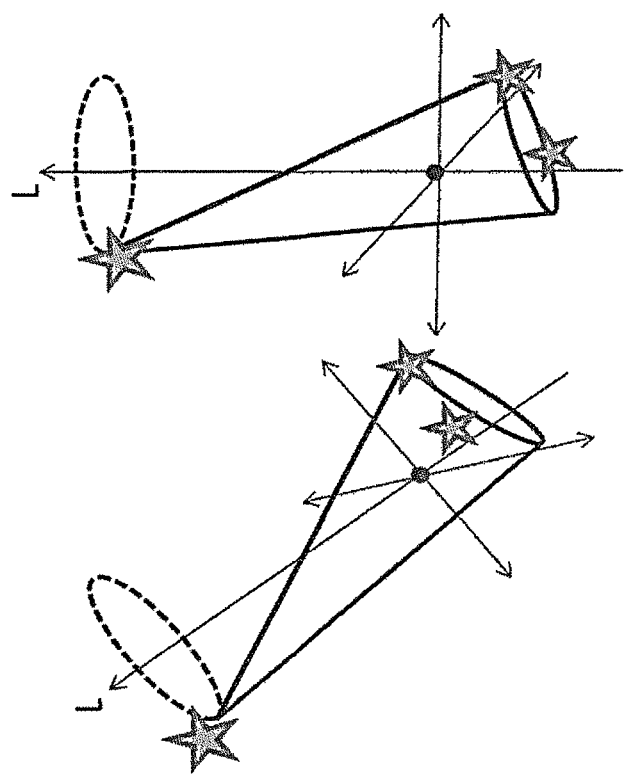
FIG. 12 is a schematic diagram illustrating a scatterer attached to any point on a rigid target executing torque-free motion accelerates non-ballistically according to gravity.
Figure 13:
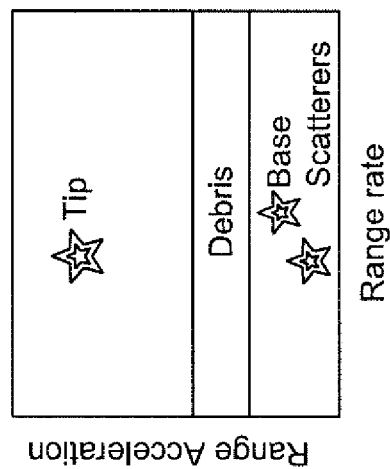
FIG. 13 is a schematic diagram of a velocity-acceleration image showing debris and other small targets that move ballistically and confined to a narrow strip at acceleration g.
Figure 14:
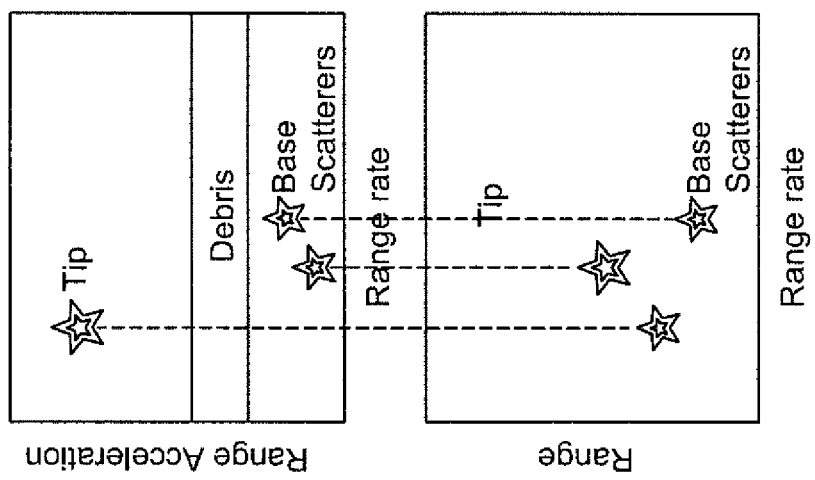
FIG. 14 is a schematic diagram showing processing range acceleration image and conventional range Doppler image together to determine range and velocity of non-debris scatterers.

Referring now to the process flow diagram of FIG. 11, in conjunction with FIGS. 12-14 and the specific embodiment illustrated in FIG. 10, there is illustrated a technique for screening debris fragments and simultaneously estimating range, velocity and acceleration using linear (DFT) processing only.

As is understood by one of ordinary skill in the art, a range-Doppler image is a two-dimensional representation of the power in a bank of filters matched simultaneously to target range and radial velocity. The concept can be generalized to incorporate any parametric model of radar phase. The concept of image may be generalized to include the additional dimension of range acceleration. A technique for constructing such a Range-Velocity-Acceleration (RVA) image includes separating targets of relatively small extent, including debris fragments, that move along strictly ballistic trajectories, from targets that accelerate non-ballistically. The class of non-ballistic scatterers includes scatterers attached to extended rigid targets in any non-degenerate state of torque-free ballistic motion. In accordance with an aspect of the present disclosure, there is provided a signal processing technique for producing a (two-dimensional) velocity-acceleration (VA) image. This image has the advantage that it can be formed using the two-dimensional discrete Fourier transform only. The processing is for all practical purposes what is needed to construct an ordinary range-Doppler image.

By way of background, the center of mass of a rigid target not performing any active maneuver moves as if it were a point mass under the influence of gravity alone. But scatterers attached to any other point on the target experience non-ballistic acceleration, due to the rigid body constraints. This effect is most pronounced for physically long targets in states of pure tumble, spin-precession or more chaotic tumbling motion associated with mass asymmetry. Conventional radar signal processing techniques such as range-Doppler imaging are based on the implicit assumption that scatterers of interest move along straight lines throughout a coherent measurement interval or CPI. This condition can be made to hold to within a fixed tolerance by making the CPI sufficiently short. The technique as described herein handles scatterers that exhibit substantially constant acceleration as well as constant velocity during the CPI. The presently disclosed RVA process works particularly in the coordinates range rate and range acceleration. The image can be formed using entirely conventional signal processing based on the two-dimensional DFT.

This technique may be implemented in a computer processor in which a set of coded programming instructions are executed to perform the method disclosed herein. By way of example, let a scatterer be modeled as a point with constant velocity and constant acceleration throughout the CPI. In the far field of the radar, the two-way phase to such a scatterer at each wideband frequency f is $$\phi(f, t \mid r, v, a) = \frac{4\pi f}{c}\left(r - vt - \frac{1}{2}at^2\right) \quad (4)$$

The variables (r, v, a) denote the position, velocity and acceleration of the scatterer, projected onto the radar line-of-sight. The sign convention is such that positive velocity is interpreted to mean range decreasing with time.

A method of phase differences will be used to pre-process the received in-phase and quadrature (I&Q) data prior to imaging. The measured I&Q data at wideband frequency f and time t is denoted by Z(f,t), form a new modified sequence as follows $$\tilde{Z}(f,t) = Z(f,t+\Delta)Z^*(f,t-\Delta) \quad (5)$$

Where $\Delta$ denotes the PRI of the wideband Doppler burst. The phases of the modified sequence of I&Q measurements are modeled as $$\tilde{\phi}(f,t) = \phi(f,t+\Delta) - \phi(f,t-\Delta) \quad (6)$$

$$\phi(f, t+\Delta) = \frac{4\pi f}{c}\left(r - v(t+\Delta) - \frac{1}{2}a(t+\Delta)^2\right) \quad (7)$$

$$= \frac{4\pi f}{c}\left(r - vt - v\Delta - \frac{1}{2}at^2 - \frac{1}{2}a\Delta^2 - a\Delta t\right)$$

$$\phi(f, t-\Delta) = \frac{4\pi f}{c}\left(r - v(t-\Delta) - \frac{1}{2}a(t-\Delta)^2\right) \quad (8)$$

$$= \frac{4\pi f}{c}\left(r - vt + v\Delta - \frac{1}{2}at^2 - \frac{1}{2}a\Delta^2 + a\Delta t\right)$$

$$\tilde{\phi}(f, t) = -\frac{8\pi \Delta f}{c}(v + at) \quad (9)$$

A matched filter image in the space (v, a) of generalized coordinates is $$\Phi(v, a) = \sum_f \sum_t \tilde{Z}(f, t) e^{+\frac{8\pi \Delta f}{c}(v+at)} \quad (10)$$

$$I(v,a) = \Phi^*(v,a)\Phi(v,a) \quad (11)$$

The phase factor being linear in time, the required processing amounts to a two-dimensional DFT. The power in the bank of velocity-acceleration filters (the velocity-acceleration image) is denoted by I(v, a).

FIG. 12 illustrates the concept of a long tumbling or spinning and precessing object or target. Only the center of mass moves according to gravity. FIG. 13 illustrates the appearance of the velocity-acceleration image for a target in the presence of debris. The target is detectable in the clear region outside the clutter ridge.

FIG. 14 depicts the utilization of the velocity-acceleration image and the conventional range-Doppler image together to recover range and range rate of non-debris scatterers. Any scatterer that does not have a Doppler corresponding to a scatterer detected in the velocity-acceleration image is filtered out as debris.

Thus, referring to FIGS. 11-14, the process for screening debris fragments and simultaneously estimating Range, Velocity and Acceleration using linear (DFT) processing only is as follows 1. Form the Velocity-Acceleration image using Equations 10 and 11. Because of the phase difference pre-processing that was employed, the exponent of the complex phase factor is linear in the parameters range velocity and range acceleration, therefore the computation of this image requires only a 2D DFT (it is formally identical to conventional range-Doppler image formation).
2. Perform detection of scatterers and rejection of targets exhibiting ballistic acceleration (debris fragments) in the VA image (Fig).
3. RVA processing can be used to simultaneously estimate the parameters (r,v,a) according to the (nonlinear) expressions $$\langle f, t \mid r, v, a \rangle = Z(f, t) e^{\frac{4\pi f}{c}\left(r - vt - \frac{1}{2}at^2\right)} \quad (12)$$

$$I(r, v, a) = \langle r, v, a \mid r, v, a \rangle \quad (13)$$

$$= \left|\sum_f \sum_t w(f, t) Z(f, t) e^{\frac{4\pi f}{c}\left(r - vt - \frac{1}{2}at^2\right)}\right|^2$$

However, the parameters v and a have already been estimated for the non-debris detections. The factors containing time are now constants, so expression (9) reduces to the ordinary expression for forming a range profile via pulse compression as follows. Let $$Z'(f) = \sum_t w(f,t) Z(f,t) e^{-\frac{4\pi f}{c}\left(vt+\frac{1}{2}at^2\right)} \quad (14)$$

$$I(r,v,a) = \left|\sum_f Z'(f) e^{-\frac{4\pi f}{c}r}\right|^2 \quad (15)$$

In this fashion, the full set of parameters (r,v,a) are calculated for all non-debris objects in the scene using linear processing only (one 2 dimensional DFT to form the VA image followed by one 1 Dimensional DFT per detection).

Thus, a signal processing technique has been described for producing velocity-acceleration images. Such images have the significant advantage that they can be calculated using ordinary 2 Dimensional DFT processing, as opposed to non-linear processing as in the case for other RVA imaging techniques. Several approaches may be implemented for mitigating clutter and debris using these images, as is understood by one of ordinary skill in the art. Furthermore, detection of non-ballistic targets may be performed and their coordinates (r,v,a) estimated using linear operations (DFTs) only. The ability to screen out ballistic debris fragments and simultaneously perform parameter estimation on detected objects using linear DFT processing only is a significant advantage of the disclosed processing technique using phase difference processing.

Estimating the Motion State and Length of a Target Using Radar

Figure 15:
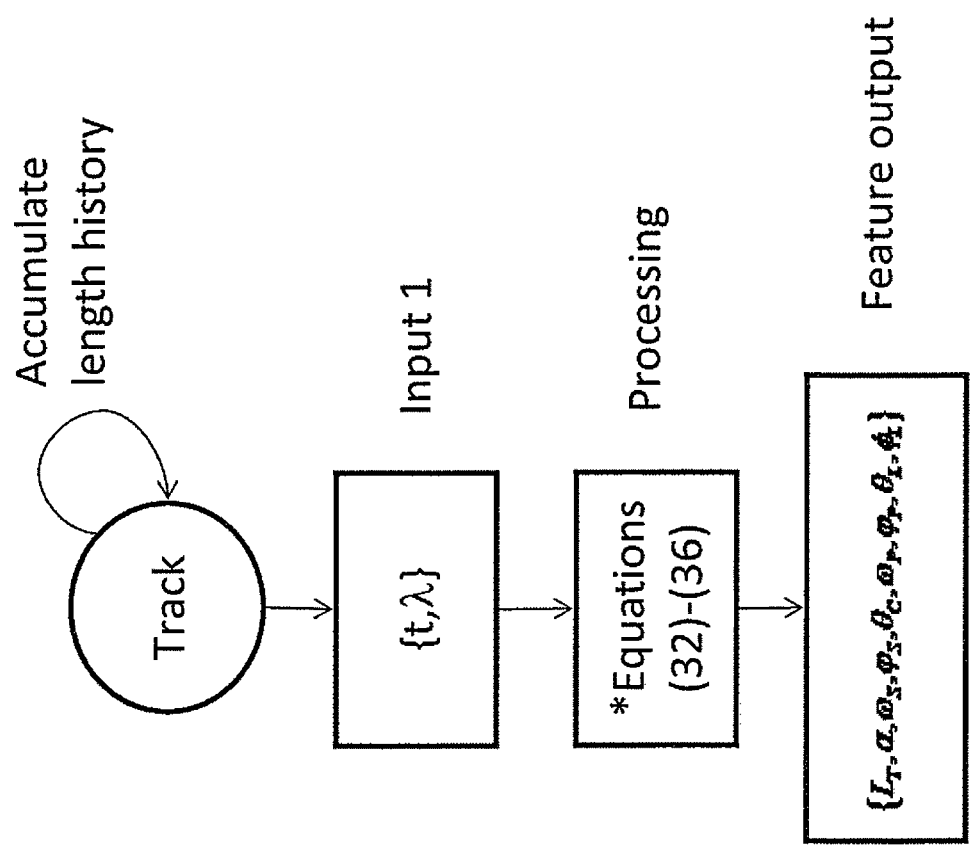
FIG. 15 is a schematic flow diagram showing a method for estimating rotational motion state and electrical length of a ballistic target using radar according to an aspect of the disclosure.
Figure 16:
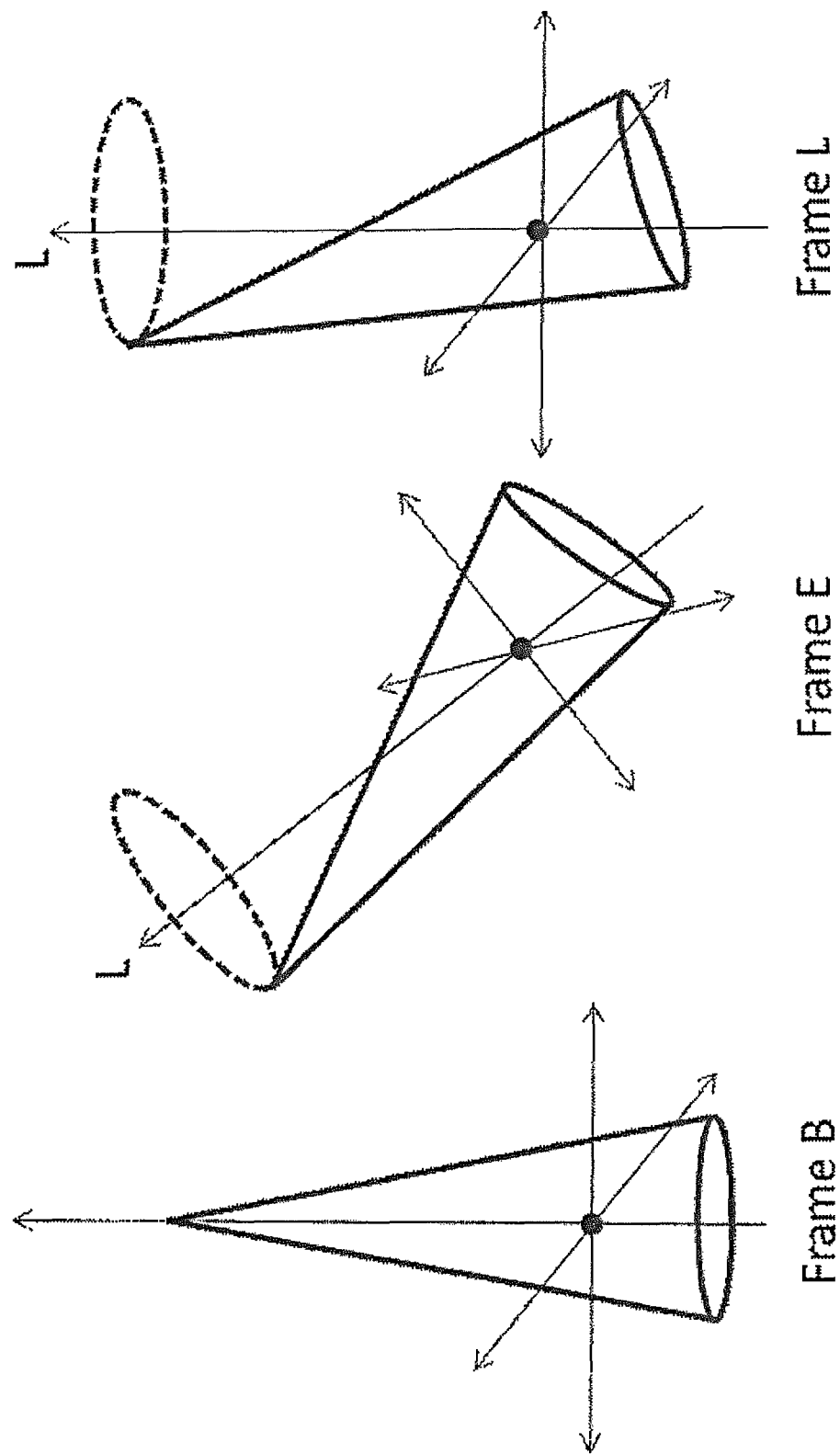
FIG. 16 is a schematic diagram showing spin-precession motion of a mass-symmetric target viewed in three frames.
Figure 17:
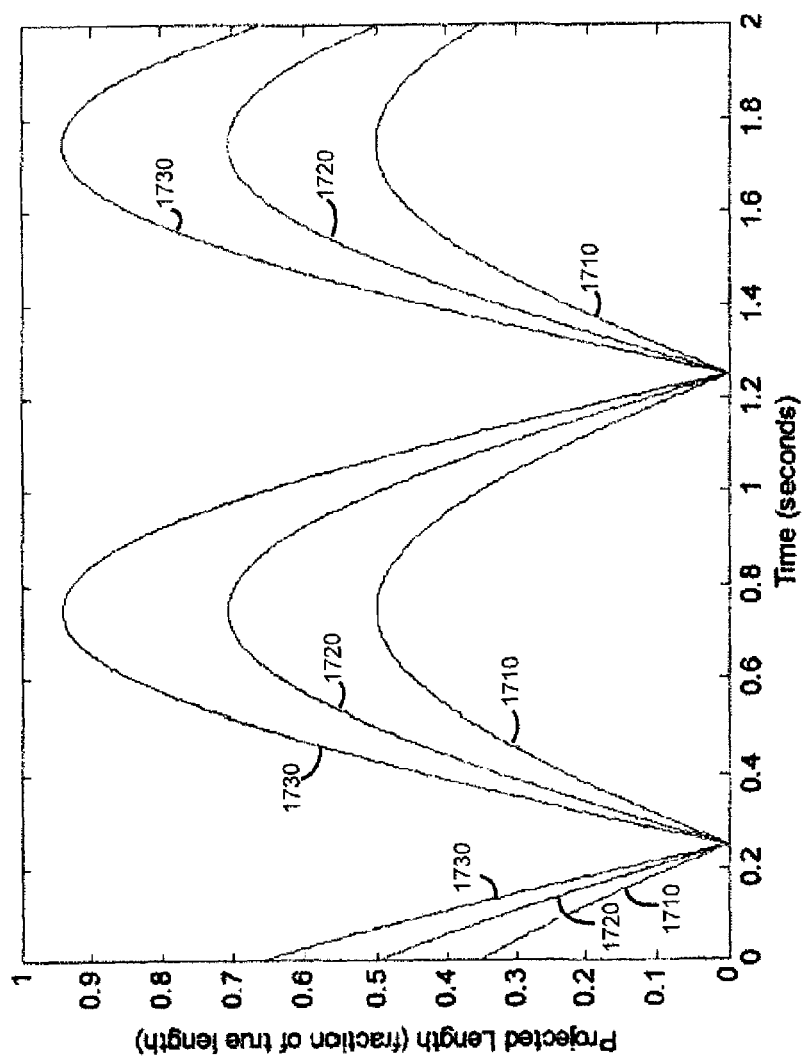
FIG. 17 is a graph of projected length as a function of time (no Principal Axis Tilt).

Referring now to the process flow diagram of FIG. 15, in conjunction with FIGS. 16-18 and the specific embodiment illustrated in FIG. 10, there is illustrated a technique for estimating the motion state and length of a target using radar according to an aspect of the present disclosure.

Estimation of the complete rotational motion state and also the electrical length of a target may be implemented using a history of data derived from wideband radar pulses. It is understood by one of ordinary skill in that art that various known methods have been developed for determining the rotational motion state of a ballistic target using radar. However, the method as disclosed herein includes a number of advantages over conventional methods, including: (1) the disclosed method does not require that the RCS pattern of the target be axially symmetric; (2) the disclosed method may be implemented with a single channel linearly polarized radar, and; (3) The computational requirements of the disclosed method are relatively modest.

Rotational motion estimation methods have in common a certain physics background that describes the rotational motion of rigid targets in the absence of external torques. This background is presented here in a form that is suitable for the description of the new algorithm. The simplifications that correspond to the degenerate cases of a tumbling target and an inertially stable target are described herein along with the processing steps for implementing the new technique. The disclosed technique may be implemented in a stand alone mode and/or in combination with other known techniques, and may be particularly suited to assist in ballistic missile discrimination and handover operations.

By way of background, targets in exoatmospheric ballistic motion remain in a torque-free state throughout the interval of time between deployment and any active maneuvers, and also during the intervals in between such maneuvers. In these cases, the rotational motion is described by a closed form matrix function of time and several invariant quantities. A radar measurement made on a target during one of these torque-free intervals provides an equation in the several rotational invariants. Among the observable quantities that can be expected to yield information about the motion state and other characteristics of the target is the single pulse narrowband RCS. If the RCS pattern of the target is symmetric about an axis, the RCS static pattern can be reconstructed based on a smoothness criterion as described in the publication of Paul D. Mountcastle and Matthew G. House, "Static Pattern Reconstruction Using Measured Radar Data" Proceedings of the MD-SEA Conference, Monterey Calif., January 2003, the subject matter thereof included herein by reference in its entirety. A single-channel linearly polarized radar presents a difficulty for this approach, since the RCS is in that case modulated by the rotation of the target about the line-of-sight in a way that is not predictable using the one linear polarization channel alone. The requirement that the target RCS pattern have an axis of rotational symmetry, and also the difficulties with polarization, are overcome by taking a fully coherent approach as described in U.S. Pat. Nos. 7,724,183 and 7,994,967 issued to Paul D. Mountcastle. However, that class of techniques has not proved to be computationally feasible as a means of obtaining a motion solution. The technique described herein overcomes the difficulties by using electrical length measurements based on wideband RCS range profiles instead of narrowband RCS measurements to estimate the motion parameters. It also leads to a computational problem which appears to be tractable, and which is particularly suited to detecting and characterizing targets that exhibit degenerate motion, such as tumbling targets and space-stable targets.

It should be understood that a frame of reference is a set of three mutually orthogonal unit vectors. The coordinates of a vector are the scalar products of the vector with each of these unit vectors. Coordinate transformations are 3×3 orthogonal matrices that convert the coordinates of a vector expressed in one reference frame into the coordinates of the same vector expressed in a different frame. One can denote a frame of reference abstractly by a single letter (e.g. A) and a different frame by a different letter (e.g. B). The symbol [B A] taken as a whole is meant to denote a matrix. Note that the letters A and B are not meant to denote matrices, but instead are labels that refer to a given frame of reference abstractly. In this notation, the entire symbol [A B], taken as a whole, is meant to denote the 3×3 transformation matrix that connects the two frames. It represents the transformation matrix that converts the coordinates of a vector expressed in reference frame A into the coordinates of the same vector expressed in reference frame B. According to the meaning of the matrix symbols $$[BA]=[AB]^{-1}=[AB]^T \quad (16)$$

$$[BA]=[BC][CA] \quad (17)$$

Where C is a third frame of reference. Any number of additional frames can be inserted, in accordance with the contraction rule (2) above, as [B A]=[D C][ B A].

Transformation matrices may be constant, or they may depend on time. A general notation describes a matrix-valued function of time and some parameters, as [B A](t|α,β,γ ...) or more briefly [B A](t|q). That should be read as a 3×3 coordinate transformation matrix depending on time and some other constant parameters q. It is a matrix-valued function of time and the other invariant parameters q. A transformation that is constant in time would be denoted [B A](q), without the reference to time.

Matrices act on column vectors on the right and row vectors on the left. Distinction is made between row vectors and column vectors by using the symbol $\langle a|$ to denote the coordinates $(a_X a_Y a_Z)$ of a vector laid out in a row and $|a\rangle$ (with the same label) to denote the column vector formed by transposing the row, following the notation of P.A.M. Dirac, *The Principles of Quantum Mechanics*, 4th Edition, Oxford University Press, Oxford (1958). The notation is most often used in the context of a complex linear vector space. In the general case of complex vectors, the two kinds of vector symbols represent Hermitian conjugates (complex conjugate transposes). For real vectors like the ones described herein, they are simply transposes. A symbol like $\langle a|b\rangle$ is then the scalar product between two vectors. A symbol like $\langle a|[A\ B]|b\rangle$ is also a scalar. It has sense only if $|b\rangle$ are the coordinates of a vector expressed in frame B and $\langle a|$ are the coordinates of a vector expressed in frame A. The strong syntax of the notation has a helpful effect by assuring that the matrix factors are correctly ordered and transposed when writing down involved expressions. Some of that utility is put into evidence in the discussion of the torque-free motion of an inertially symmetric rigid target.

Regarding rotational kinematics, the mechanical properties of a rigid target are contained in a matrix called the inertia tensor. If the target is modeled as consisting of a set of infinitesimal masses dm at positions $\langle x|=(x\ y\ z)$ in some frame of reference, the inertia tensor is a general 3×3 matrix with definition $$I = \int dm\{|x\rangle\langle x| - \langle x|x\rangle 1\} = \quad (18)$$

$$\int dx\rho(x)\begin{bmatrix} -(y^2+z^2) & xy & xz \\ yx & -(x^2+z^2) & yz \\ zx & zy & -(x^2+y^2) \end{bmatrix}$$

where $\rho(x)$ denotes the mass density of the target, and 1 is the 3×3 unit matrix. The integration is over the entire rigid target. The numerical values of this inertia tensor depend on the reference frame in which it is calculated. It is not an orthogonal matrix, but it is symmetric by definition. As such, it can be diagonalized by an orthogonal transformation that is called in mechanics the "Principal Axis Transformation". If the frame of reference with respect to which the inertia tensor is calculated is denoted by E, the Principal Axis Transformation may be written in the following suggestive form:

$$I=[EB]\Lambda[BE] \quad (19)$$

$$\Lambda = \text{diag}(I_X, I_Y, I_Z) = \begin{bmatrix} I_X & 0 & 0 \\ 0 & I_Y & 0 \\ 0 & 0 & I_Z \end{bmatrix} \quad (20)$$

The scalar quantities $(I_Z, I_X, I_Y)$ are called the principal moments of inertia. The orthogonal matrix $[E\ B]$ that effects the transformation is interpreted as implicitly defining a new reference frame B, called the principal axis frame, which is fixed in the target. The convention is chosen such that the three principal moments of inertia go in decreasing order. The interpretation of this convention is that the target has the smallest moment of inertia against rotations about the third principal axis (z-axis of the principal axis frame B). For example, a long symmetrical target like a right-circular cone would have the z-axis of its principal axis frame B along the line joining the center of the base to the tip of the cone. The physical meaning of the statement that the third principal moment of inertia is the smallest is that it requires a smaller torque to induce a given rotational acceleration about the symmetry axis z than it does to induce the same rotational acceleration about the orthogonal axis (an end over end rotation).

If the target is in any state of rotation, it is captured in the time dependence of the transformation matrix $[E\ B]$. The principal moments of inertia are intrinsic to the distribution of mass expressed in the principal axis frame B, and are independent of orientation. Every orthogonal matrix can be written as a composition of three elementary rotations (Euler angle rotations). Let the elementary rotations about axis z and axis y, respectively, be denoted by $$Z(\xi) \equiv \begin{bmatrix} \cos\xi & \sin\xi & 0 \\ -\sin\xi & \cos\xi & 0 \\ 0 & 0 & 1 \end{bmatrix} \quad (21)$$

$$Y(\lambda) \equiv \begin{bmatrix} \cos\lambda & 0 & -\sin\lambda \\ 0 & 1 & 0 \\ \sin\lambda & 0 & \cos\lambda \end{bmatrix} \quad (22)$$

We can express the coordinate transformation formally as a complete three-angle rotation $$[EB](t)=Z(\psi(t))Y(\theta(t))Z(\phi(t)) \quad (23)$$

If the principal moments of inertia $\{I_X, I_Y, I_Z\}$ defined by Equations 7 and 8 are all different, and there are no external torques acting on the target, the Euler angles $\{\theta(t),\phi(t),\psi(t)\}$ depend on initial conditions and on time through transcendental functions (Jacobi Elliptic functions and Elliptic integrals). The solution in the general case is summarized in L. D. Landau and E. M. Lifshitz, Mechanics, Third Edition, Section 37, Pergamon Press, Oxford (1976). The complete classical treatment of this problem can be found in E. T. Whittaker, A Treatise on the Analytical Dynamics of Particles and Rigid Bodies, Chapter VI, Dover, N.Y. (1944). This general solution has interest e.g. in the study of satellite motions and the detailed rotational motions of asymmetric debris pieces. Principal objects in a ballistic missile threat complex including typically a Tank, a PBV or ACM, RVs and decoys may be assumed to be axially symmetric in their mass distributions, meaning that $I_X=I_Y$. That gives the inertially symmetric case special importance. In this symmetric case, the rotational motion reduces to an expression in trigonometric functions of time, as follows.

The angular momentum L is an invariant vector when expressed in any stationary inertial reference frame. Note that the term inertial frame is used here as it is in mechanics. An inertial frame is any frame of reference that is stationary with respect to the fixed stars, so that there are no apparent forces or torques (e.g. centrifugal or Coriolis forces) owing to the acceleration of the reference frame itself. Angular momentum is an invariant vector quantity when expressed as a set of coordinates relative to an inertial frame. The angular momentum direction (unit vector in the direction of L) may written in terms of polar angles $(\theta_L,\phi_L)$ as a column vector in the ECI frame $$|l\rangle = \begin{bmatrix} \sin\theta_L \cos\phi_L \\ \sin\theta_L \cos\phi_L \\ \cos\theta_L \end{bmatrix} \quad (24)$$

The rotational motion of the target consists of a coning and spinning motion about the inertially invariant angular momentum direction, called spin-precession. This type of motion is depicted in FIG. 16. The cone on the left is shown in the frame B whose axes are the body-fixed principal axes. The cone in the center is shown precessing about the invariant angular momentum vector L in the ECI frame E. The direction of the vector L is arbitrary with respect to the axes of reference frame E. Finally, the cone on the left is shown precessing about the z-axis in reference frame L. The matrices [B E] and [E L] effect the coordinate transformations among the three frames.

The reference frame E, with respect to which the unit vector 1) is written, is a stationary inertial frame. For concreteness, we will suppose that E is the standard Earth-Centered Inertial (ECI) frame William Tyrell Thompson, Introduction to Space Dynamics, Dover Books, New York (1986). The frame of reference in which the spin-precession motion is simplest to describe is also an inertial frame, to which we can assign the abstract label L. The z-axis of this new frame L is oriented along the angular momentum vector. Inserting this new frame according to the pattern of Equation (3), we have $$[EB]=[EL][LB] \quad (25)$$

$$[EL](\theta_L,\phi_L)=Z(\phi_L)Y(\theta_L) \quad (26)$$

The last expression uses the standard rotation matrix forms given in (9) and (10). The coning and spinning motion can now be written $$[LB](t|\omega_S,\phi_S,\theta_C,\omega_P,\phi_P)=Z(\omega_P t+\phi_P)Y(\theta_C)Z(\omega_S t+\phi_S) \quad (27)$$

The target is viewed as first spinning about its principal axis at angular velocity $\omega_S$, second tipping over through an angle $\theta_C$ called the half-cone angle, and finally precessing about the principal axis at angular velocity $\omega_P$. That describes the spinning and coning motion. Combining the expressions $$[EB](t|q)=Z(\phi_L)Y(\theta_L)Z(\omega_P t+\phi_P)Y(\theta_C)Z(\omega_S t+\phi_S) \quad (28)$$

Where the invariant parameters q that describe the motion are the seven quantities $$q=\{\omega_S,\phi_S,\theta_C,\omega_P,\phi_P,\theta_L,\phi_L\} \quad (29)$$

Equation (28) is the needed formula for the rotational motion of the target in terms of parameters that are purely descriptive of the motion. The appearance of seven parameters is accounted for in the dynamical formulation of the problem by six initial conditions (Euler angles and Euler rates) plus the one independent moment of inertia ratio $I_3/I_1$. The geometrical descriptive parameters in Equation (29) are suitable for handling the discrimination algorithm in the inertially symmetric case.

It is important to note that, for a target that is truly rotationally symmetric in both its inertial characteristics and its radar reflectivity characteristics, the spin motion is not observable as a matter of symmetry. For example, a perfect cone or a perfect cylinder spinning about its symmetry axis is not distinguishable by means of electromagnetic observations from one that is not spinning, or spinning at a different rate. That follows also from the form of Equation (28). But it is often the case for space objects that the axis of symmetry of a target from the radar scattering point-of-view and the mechanical principal axis are not aligned.

One of these sets of axes is a characteristic of the scattering of the target, and so is related to the symmetry of the exterior scattering surface, sometimes called the skin of the target. The other set of axes, the principal axes of inertia B, are completely determined by the mass distribution of the target, according to Equation 7. One frame of reference has a purely electromagnetic significance and the other a purely dynamical significance, so there is no a priori relationship between them. A skew between these axes is called a Principal Axis Tilt. This type of tilt is commonly observed in space objects. The existence of a principal axis tilt breaks the symmetry even if the target is symmetrical both from an electromagnetic scattering and a mechanical point of view. This renders the spin rate and the spin phase observable. The effect of this tilt in radar measurements is sometimes described as a wobble, because all aspects of the electromagnetic pattern of the target are modulated by the spin frequency. However, the term wobble is imprecise, since it is used variously to denote modulations of the radar signature due to several causes. The term principal axis tilt is used herein for the common type of modulation that is described here. The spin frequency is most often observed as a side effect of this principal axis tilt, which impresses itself on the phases of the radar pulse returns.

The case of a principal axis tilt can be handled by introducing a system of coordinates that differs from the principal axis frame B only by virtue of a tilt through an angle $\alpha$. In the case of a conducting cone, for example, this would be the electromagnetic symmetry axis passing through the tip of the target. Therefore we will call this electromagnetic symmetry frame T, for tip. The existence of the tilt make the angle $\alpha$, the spin angular velocity $\omega_S$ and the spin phase $\phi_S$ observable by the radar. The orientation of the electromagnetic symmetry axis of the target is $$[ET](t|q,\alpha)=[EB](t|q)[BT](\alpha) \quad (30)$$

$$[ET](t|q,\alpha)=Z(\phi_L)Y(\theta_L)Z(\omega_P t+\phi_P)Y(\theta_C)Z(\omega_S t+\phi_S)Y(\alpha) \quad (31)$$

FIG. 17 shows the variation of ideal projected length with time for a case with $\alpha=0$. The half-cone angle is taken to be 30° (curve 1710 "red"), 45° (curve 1720 "blue") and 70° (curve 1730 "green"). The precession period is 2 seconds. The target is spinning about its symmetry axis with a period of 0.2 seconds. As remarked, the spin rate of the target is not observable as a matter of principle, since the skin of the target is symmetric under a rotation about its spin axis.

FIG. 18 shows the variation of the projected length of a target with time for a case with $\alpha=5°$. The half-cone angle is taken to be 30° (curve 1810 "red"), 45° (curve 1820 "blue") and 70° (curve 1830 "green"). The precession period is 2 seconds. The target is spinning about its symmetry axis with a period of 0.2 seconds. The Principal Axis Tilt renders the spin of the target observable.

According to an aspect of the present disclosure, a method for estimating electrical length of a target projected along the radar line of sight is obtained with reference to the flow diagram of FIG. 15. It is of course understood that the electrical length is the length measured by a radar. This length has the ideal interpretation of the distance between the two most extremely separated scatterers. The electrical length is a measure of delay, and differs from this ideal length due to various physical effects including shadowing of scatterers and off-body scattering.

Outside of measurement errors, the projected electrical length of the target is given by $$\lambda(t)=L_T|\cos\psi(t|q,\alpha)| \quad (32)$$

$$\cos\psi(t|q,\alpha)=\langle r(t)|[ET](t|q,\alpha)|t\rangle \quad (33)$$

Where $\psi$ is the time-varying aspect angle of the target, $\lambda(t)$ denotes the observed (apparent) length of the target at pulse time t, $L_T$ denotes the electrical length of the target, $|t\rangle = (0\ 0\ 1)^T$ is the unit vector drawn from the base to the tip of the target in the radar coordinate system T, and $|r(t)\rangle$ is a unit vector drawn in the direction joining the radar to the target (the unit line-of-sight vector) expressed in ECI coordinates. If the tracked position of the target in ECI coordinates is C(t) and the radar position in ECI coordinates is R(t), then $$r(t) = \frac{C(t) - R(t)}{\|C(t) - R(t)\|} \quad (34)$$

$$\langle r(t)| = (r_x, r_y, r_z) \quad (35)$$

$$\Delta(L_T, q, \alpha) = \sum_t \{\lambda(t) - L_T |\langle r(t)|[ET](t \mid q, \alpha)|t\rangle|\}^2 \quad (36)$$

The electrical length $L_T$, the principal axis tilt $\alpha$ and the complete motion state q of the target are found by minimizing the least squares sum $\Delta(L_T, q, \alpha)$ with respect to the nine independent parameters $\{L_T, \alpha, \omega_S, \phi_S, \theta_C, \omega_P, \phi_P, \theta_L, \phi_L\}$.

The case of a target in pure tumble motion is commonly seen in space objects. This state is characterized by the special conditions $$\theta_C = \pi/2$$

$$\omega_S = 0$$

$$\phi_S = 0 \quad (37)$$

The precession frequency and phase are called in that case the tumble frequency and tumble phase. To characterize a target in pure tumble, we need to minimize the simplified quantity $$\Delta_T(L_T, q_T) = \sum_t \{\lambda(t) - L_T |\langle r(t)|[EB](t \mid q_T)|t\rangle|\}^2 \quad (38)$$

$$q_T = \{\omega_T, \phi_T, \omega_S, \phi_S, \theta_L, \phi_L\} \quad (39)$$

The quantity $\Delta_T$ may be treated as a relative feature that indicates a tumbling target. A more sophisticated normalized tumbling target feature is $\Delta/\Delta_T$, where the numerator is arrived at by optimizing over the full parameter space, and the denominator is arrived at by optimizing over the tumble subspace as in Equation (39). A value near 1 for the ratio indicates that the tumbling model was a good fit to the data, an indication that the target was tumbling. That is independent of the values obtained for other targets. The feature $\Delta_T$ is easier to obtain, and is useful as a relative feature.

Another special case of interest is a target that neither tumbles nor spins during the observation interval, but is inertially stable. In that case, the needed criterion is to minimize the quantity $$\Delta(L_T, q_S) = \sum_t \{\lambda(t) - L_T |\langle r(t)|[EB](t \mid q_S)|t\rangle|\}^2 \quad (40)$$

$$q_S = \{\theta_L, \phi_L\} \quad (41)$$

$\Delta_S$ may be treated as a feature indicating that the target is inertially stable. The quantity $L_T$ obtained by optimization is an estimator of the electrical length. The three-parameter optimization problem is attractive from the point of view of computation in a case where the goal is to detect an inertially stable target among a field of tumbling targets, and simultaneously estimate its length.

Thus, there has been disclosed a method for determining the rotational motion state and the electrical length of a target, based on a history of apparent length measurements taken over an interval during which it executes torque-free ballistic motion. The method is particularly well suited to the problem of identifying an inertially stable target among a field of tumbling targets, and determining its electrical length, independent of projection angle. The computational problem appears to be tractable in that case.

The rotational motion state of a target is valuable if it can be obtained by some means. Given the motion state, the RCS static pattern of the target can immediately be reconstructed using narrowband data from the same sensor or a different sensor, for example another radar or the EO/IR seeker on the exoatmospheric kill vehicle. If one or more CPIs of coherent wideband radar pulses are available from a radar, or can be scheduled, a coherent three-dimensional radar image of the target can likewise be formed, which may further aid in discrimination.

The motion state may provide a powerful continuity test, which should be of considerable value in target association and handover operations. Association of tracks is accomplished in a sensor- and geometry-independent fashion based on motion invariants. Given the rotational state from some source, It is only necessary to calculate the quantity $\Delta(L_T, q, \alpha)$ in order to determine the relative likelihood that a target under observation by the radar is executing the same motion as a given candidate target under test.

The optimization only needs to be accomplished by any one sensor at one time in order to positively associate the appearance of the same target by other tracking sensors during the same interval of torque-free ballistic motion. The problem of feature-aided track correlation, as between the radar and an IR seeker, for example, is addressed in efficient fashion by the application of the complete invariant rotational state. The disclosed method facilitates this solution, particularly in the important special cases of tumbling and inertially stable target motions.

The effectiveness of the disclosed technique may be a function of the precision and accuracy of radar length measurements made using the radar. The ability of a radar to obtain these measurements to sufficient precision and accuracy is a function of radar parameters, viewing and environment. Detailed features of the motion like principal axis tilt and spin may be difficult to estimate accurately without precise length measurements, although errors of all kinds are reduced by the use of the least squares technique. The degenerate problems of the tumbling and inertially stable target are less subtle, and is believed to be amenable to the approach even if the length measurements are not ideal.

In one preferred embodiment, the classification method is applied to monitoring whether an incoming object is a hostile (lethal) ballistic missile or a non-lethal object. The target, in such example, is the incoming object and is monitored by sensing and processing reflected radar signals from the target, through a radar and signal processor, and storing the collected information pertaining to the target as sets of feature data.

The feature data can be sensed data on one or more features of the incoming ballistic missile that can be discerned from the reflected radar signal. One example of such feature is the length of the object or ballistic missile. Other such feature(s) include the range-velocity-acceleration associated with the object.

Thus, there is disclosed a computerized classifier system that forms convex hulls containing all training experiences for each target class (e.g. threat/non-threat) is disclosed. The intersection of convex hulls for each pair of classes defines a region of ambiguity in feature space. Measurement of feature vector(s) outside an ambiguous region of feature space leads to a class decision while measurement of feature vector(s) within an ambiguous region of feature space defined by convex hulls causes a transition to a new feature space with new features. In particular embodiments, measured feature data includes estimated motion states and electrical lengths of a given object, and range, velocity and acceleration image data from second phase differences for debris mitigation.

Another exemplary application of the method of the present disclosure is for automated trading of stocks or mutual funds. The feature data can include the stock's share price such that if the price of a stock rises or falls beyond the normal fluctuation within a sliding window of time, the computer-implemented method of the present disclosure can recognize such fluctuation as a change in the state of the particular stock and shares of the stock can be automatically bought, sold, or autonomous measures taken to reduce and control the fluctuation. The sliding window of time can be any selected duration from minutes to years.

In another example, the classification method and system can be used to monitor a patient's medical state. The feature data can be any feature of the patient that can be monitored and observed by a sensor. For example, the system and method of the present disclosure may find application in ultrasound transceivers equipped and configured to execute signal processing techniques such as harmonic analysis and extract harmonic information related to a targeted organ of a subject. Such classification processing as disclosed herein may improve segmentation accuracy of the targeted organ or structures within a region-of-interest, such as the bladder, heart and lungs, by way of non-limiting example. Still further, application may be made to classification of feature data related to determination and discrimination of implantable medical devices for repair, replacement, and/or update of parameter settings associated with such devices based on monitored data and patient vitals.

In another example, the system and method can be used for mapping applications, such as monitoring traffic congestion. A counter can monitor the speed and number of cars on a highway in a set duration. If the number and speed decreases beyond the normal fluctuation, the highway may be deemed congested and an alert may be sent to parties interested in this type of information. In addition, applications include geospatial data fusion such as integration of geographical images with road network information, road vector and satellite imagery and raster data integration, and augmented reality applications for introducing animated image components to a real-world scene.

Although the invention has been described in terms of exemplary embodiments, it is not limited thereto. Rather, the disclosure should be construed broadly, to include other variants and embodiments of the invention, which may be made by those skilled in the art without departing from the scope and range of equivalents of the invention.

What is claimed is:

1. A computer-implemented method for classifying a change in the state of a target being monitored, said method comprising:

measuring feature data associated with said target during a defined time duration;

processing using a computer processor, real time sensor data from said target using a graph data structure that has defined therein convex hulls having regions of ambiguity corresponding to each of a set of target classes corresponding to target features, wherein the intersection of convex hulls for each pair of classes defines the region of ambiguity in feature space;

transitioning, according to the graph, to another feature space having different features, in response to measurement data of feature vectors within an ambiguous region of feature space defined by convex hulls; and determining using a computer processor, a next sensor measurement data for obtaining additional measured feature data of the target according to the current state of the graph data structure and the region of ambiguity; and repeating said processing, transitioning and determining steps until the change in state of the target is classified.

2. The computer-implemented method of claim 1, wherein the target being monitored is a radar target.

3. The computer-implemented method of claim 1, wherein traversal of the graph includes determining information relevant to the particular region of ambiguity associated with the target likely to reduce and/or eliminate the ambiguous region.

4. The computer-implemented method of claim 3, wherein factors including resource allocation, sensor measurement classification time constraints, feature relevance, accuracy and cost, are accounted for in generating the graph data structure.

5. The computer-implemented method of claim 3, wherein the determination and selection of next sensor measurement is accomplished according to the graph data structure and the features are sensed and analyzed using the current sensor.

6. A method for classifying unclassified vehicle tracks using real-time sensor data comprising:

acquiring a computer database of vehicle track characteristics data for known vehicle tracks;

forming convex hulls using the vehicle track characteristics data for each target class;

defining a region of ambiguity in feature space as the intersection of convex hulls for each pair of target classes; and transitioning to another feature space having different features in response to measurement data of feature vectors within an ambiguous region of feature space defined by convex hulls.

7. The method of claim 6, further comprising automatically load shedding by discriminating non-threatening tracks.

8. The method of claim 6, wherein the measured feature data includes estimated motion states and electrical lengths of a given object.

9. The method of claim 6, wherein the measured feature data includes range, velocity and acceleration image data from second phase differences for debris mitigation.

10. The method of claim 6, wherein the measured feature data is obtained via a neural network algorithm.

11. A hierarchical classifier computer system comprising a database of defined vehicle track signatures for known vehicle tracks;

a first processor executing instructions for generating a graph from the database of defined vehicle track signatures by defining state nodes corresponding to characteristics of the vehicle track signatures and defining links between defined state nodes, the links between the defined state nodes corresponding to defined vehicle track signatures and defining regions of ambiguity within a convex hull; and a second processor executing instructions for performing run-time processing of real-time sensor data corresponding to a first unclassified vehicle track by passing the real-time sensor data through the graph and performing state transitions based on the features of the measured sensor data, the region of ambiguity, and additional select feature data, until the first unclassified vehicle track is classified.

* * * * *